United States Patent
Paddock et al.

(10) Patent No.: US 12,417,573 B2
(45) Date of Patent: Sep. 16, 2025

(54) SYSTEM AND METHOD FOR GENERATING A VIRTUAL AVATAR REPRESENTING A PLURALITY OF USERS

(71) Applicant: Orpyx Medical Technologies Inc., Calgary (CA)

(72) Inventors: Cory David Paddock, Calgary (CA); Samuel Carl William Blades, Victoria (CA); Rebecca Min Wytsma, Calgary (CA)

(73) Assignee: Orpyx Medical Technologies Inc., Calgary (CA)

(*) Notice: Subject to any disclaimer, the term of this patent is extended or adjusted under 35 U.S.C. 154(b) by 267 days.

(21) Appl. No.: 18/188,118

(22) Filed: Mar. 22, 2023

(65) Prior Publication Data
US 2023/0316614 A1  Oct. 5, 2023

Related U.S. Application Data

(60) Provisional application No. 63/325,114, filed on Mar. 29, 2022.

(51) Int. Cl.
*G06T 13/00* (2011.01)
*G06F 3/01* (2006.01)

(52) U.S. Cl.
CPC .......... *G06T 13/00* (2013.01); *G06F 3/011* (2013.01)

(58) Field of Classification Search
CPC ..... G06T 13/00; G06T 2215/16; G06T 13/40; G06F 3/011; G06F 3/016; G06F 3/0334; G06F 3/0346
See application file for complete search history.

(56) References Cited

U.S. PATENT DOCUMENTS

| | | | |
|---|---|---|---|
| 6,545,682 B1 | 4/2003 | Ventrella et al. | |
| 8,130,219 B2 | 3/2012 | Fleury et al. | |
| 8,281,240 B2* | 10/2012 | Finn | G07F 17/3272 |
| | | | 715/750 |
| 8,365,076 B2 | 1/2013 | Hamilton, II et al. | |
| 8,676,541 B2 | 3/2014 | Schrock et al. | |
| (Continued) | | | |

FOREIGN PATENT DOCUMENTS

WO  2021092676 A1  5/2021

OTHER PUBLICATIONS

Hans Van Dijk et al., The Secret of Running: How to calculate your race time from your Target Power?, Stryd website, 2020.

*Primary Examiner* — Said Broome
*Assistant Examiner* — Jordan Wan Yick
(74) *Attorney, Agent, or Firm* — ATMAC Patent Services Ltd.; Andrew T. MacMillan

(57) ABSTRACT

A system, method, and computer program product for generating a virtual avatar representing a plurality of users. Sensor data is obtained from sensor sets associated with each user. A user performance metric can be determined for each user based on the corresponding sensor data. An avatar performance metric is generated based on the user performance metrics determined for the plurality of users. An avatar performance characteristic is then determined from the avatar performance metric. The avatar performance characteristic can be used to control the performance of a virtual avatar within a virtual environment. The virtual avatar can be animated and displayed within the virtual environment based on the avatar performance characteristic.

16 Claims, 10 Drawing Sheets

(56) References Cited

U.S. PATENT DOCUMENTS

| | | |
|---|---|---|
| 8,850,342 B2 | 9/2014 | DeLuca et al. |
| 9,067,097 B2 | 6/2015 | Lane et al. |
| 9,457,229 B2 | 10/2016 | Liang et al. |
| 9,855,484 B1 * | 1/2018 | Matak .................. A61B 5/0022 |
| 10,157,487 B2 | 12/2018 | Connor et al. |
| 10,463,909 B2 | 11/2019 | Chang et al. |
| 10,632,369 B2 | 4/2020 | Hardee et al. |
| 10,729,356 B2 | 8/2020 | Nino et al. |
| 10,967,271 B2 | 4/2021 | Walling |
| 11,093,815 B2 * | 8/2021 | Nims ................... A61B 5/0022 |
| 2009/0309891 A1 * | 12/2009 | Karkanias ............... A63F 13/65 |
| | | 345/581 |
| 2012/0083322 A1 | 4/2012 | Luchene |
| 2013/0002533 A1 * | 1/2013 | Burroughs ............. G16H 20/30 |
| | | 345/156 |
| 2015/0126826 A1 * | 5/2015 | Kaleal, III ............... A61B 5/11 |
| | | 600/300 |
| 2020/0027180 A1 | 1/2020 | Hoffman et al. |
| 2020/0261011 A1 * | 8/2020 | Seppänen ............ A61B 5/0255 |

\* cited by examiner

SYSTEM AND METHOD FOR GENERATING A VIRTUAL AVATAR REPRESENTING A PLURALITY OF USERS

CROSS-REFERENCE TO RELATED APPLICATIONS

This application claims the benefit of priority of U.S. Provisional Application No. 63/325,114 filed Mar. 29, 2022, which is incorporated herein by reference.

FIELD

This document relates to systems and methods for processing data from sensors monitoring human movement or human activity. In particular, this document relates to generating a virtual avatar using sensor data from multiple users.

BACKGROUND

U.S. Pat. No. 10,632,369 (Hardee et al.) discloses a method including receiving from a user a request to associate an avatar in a computer-implemented virtual world with a wearable device, creating an association between the avatar and the wearable device in response to the request, and receiving from the wearable device activity metric data for the user generated by a sensor of the wearable device. The activity metric data is generated by the wearable device in response to the wearable device sensing the user performing an activity. The method further includes determining based on the received activity metric data a type of the sensed activity, determining at least one attribute of the avatar that corresponds to the determined type of the activity, determining an amount to adjust the at least one attribute based on the received activity metric data, and adjusting the determined at least one attribute of the avatar by the determined amount.

U.S. Pat. No. 10,157,487 (Connor et al.) discloses a method, system, and computer-readable program product for modifying at least one virtual activity capability of an avatar in a virtual reality setting based on a real-world physical activity metric of a user of the virtual reality setting. The user's physical activity metrics are tracked via a fitness tracker or other biometric sensor. As the user's physical activity metric(s) improve, the virtual activity capabilities of the user's avatar in the virtual reality setting also improve.

SUMMARY

The following summary is intended to introduce the reader to various aspects of the detailed description, but not to define or delimit any invention.

A system, method and computer program product for generating a virtual avatar representing a plurality of users is disclosed. In some examples, sensor data is obtained from sensors associated with each of the users while those users are performing an activity. A user performance metric can be determined for each user using the corresponding sensor data. An avatar performance metric can then be generated based on the user performance metrics from the plurality of users. The avatar performance metric can be used to determine an avatar performance characteristic for the virtual avatar. The avatar performance characteristic can be used to generate a virtual avatar. An animation of the virtual avatar(s) can be generated based on respective avatar performance characteristics. The virtual avatar(s) can be displayed to users. The virtual avatars can participate in virtual interactive activities such as competitions with virtual avatars corresponding to other groups users.

According to some aspects, a method for generating a virtual avatar representing a plurality of users includes: obtaining first sensor data from a first sensor set associated with a first user; determining a first user performance metric from the first sensor data; obtaining second sensor data from a second sensor set associated with a second user; determining a second user performance metric from the second sensor data; generating an avatar performance metric based on the first user performance metric and the second user performance metric; and determining an avatar performance characteristic from the avatar performance metric.

The method can include generating an animation of the virtual avatar based on the avatar performance characteristic; and displaying the animation.

The method can include obtaining at least one additional sensor data from at least one additional sensor set associated with at least one additional user, respectively; and determining at least one additional user performance metric from the at least one additional sensor data, wherein the avatar performance metric is generated based on the at least one additional user performance metric, the first user performance metric and the second user performance metric.

The avatar performance metric can be generated by selectively combining the first and second user performance metrics.

The first user performance metric can be a first power curve, the second user performance metric can be a second power curve, and the avatar performance metric can be an avatar power curve.

The first power curve can correspond to a maximum power exerted by the first user over time.

The second power curve can correspond to a maximum power exerted by the second user over time.

The avatar power curve can be generated by: identifying, for each point in time along the first and second power curves, a maximum value for that point in time, where the maximum value for each point in time is identified as the larger of the two power values in the first and second power curves at that point in time; and defining the avatar power curve using the maximum value for each point in time.

The first power curve can be determined by: determining, for at least three intervals, a first interval-specific power curve from the first sensor data; and determining the first power curve by combining the interval-specific power curves from each interval; and the second power curve is determined by: identifying, for the at least three intervals, a second interval-specific power curve from the second sensor data; and determining the second power curve by combining the second interval-specific power curves from each interval.

The at least three intervals can include an alactic interval, an anaerobic lactic interval and a lactic interval.

Each maximum value of the first and second power curves can be identified in a session log.

The first sensor set can include a first sensor pair and the second sensor set can include a second sensor pair.

The first sensor set and the second sensor set can be provided using respective wearable devices, and the respective wearable devices can include footwear.

The footwear can be an insole.

The avatar performance metric can be degraded based on at least one of an asymmetry factor, a smoothness factor, a movement efficiency factor or a training frequency factor determined from the first or second sensor data.

The avatar performance characteristic can be degraded based on at least one of an asymmetry factor, a smoothness factor, a movement efficiency factor or a training frequency factor determined from the first or second sensor data.

The first sensor data can include force sensor data from a plurality of force sensors positioned underfoot of the first user.

The first sensor data can include inertial motion data from an IMU positioned on the first user.

The avatar performance characteristic can be selected from the group consisting of a running speed, a cycling speed, a skating speed, and a cross-country skiing speed.

The first user performance metric can be a first user pace, the second user performance metric can be a second user pace, and the avatar performance metric can be an avatar pace.

According to some aspects, a system for generating a virtual avatar representing a plurality of users includes first and second sensor sets wearable by first and second users, respectively; one or more processors communicatively coupled to the first and second sensors; and a non-transitory storage memory. The one or more processors are configured to: obtain the first sensor data from the first sensor set associated with a first user; determine a first user performance metric from the first sensor data; obtain the second sensor data from the second sensor set associated with the second user; determine a second user performance metric from the second sensor data; generate an avatar performance metric based on the first user performance metric and the second user performance metric; and determine an avatar performance characteristic from the avatar performance metric.

The one or more processors can be further configured to: generate an animation of the virtual avatar based on the avatar performance characteristic; and display the animation.

The one or more processors can be further configured to: obtain at least one additional sensor data from at least one additional sensor set associated with at least one additional user, respectively; and determine at least one additional user performance metric from the at least one additional sensor data, wherein the avatar performance metric is generated based on the at least one additional user performance metric, the first user performance metric and the second user performance metric.

The one or more processors can be configured to generate the avatar performance metric by selectively combining the first and second user performance metrics.

The one or more processors can be configured to determine the first user performance metric as a first power curve, the second user performance metric as a second power curve, and the avatar performance metric as an avatar power curve.

The one or more processors can be configured to determine the first power curve to correspond to a maximum power exerted by the first user over time.

The one or more processors can be configured to determine the second power curve to correspond to a maximum power exerted by the second user over time.

The one or more processors can be configured to generate the avatar power by: identifying, for each point in time along the first and second power curves, a maximum value for that point in time, where the maximum value for each point in time is identified as the larger of the two power values in the first and second power curves at that point in time; and defining the avatar power curve using the maximum value for each point in time.

The one or more processors can be configured to: determine the first power curve by: determining, for at least three intervals, a first interval-specific power curve from the first sensor data; and determining the first power curve by combining the interval-specific power curves from each interval; and determine the second power curve by: identifying, for the at least three intervals, a second interval-specific power curve from the second sensor data; and determining the second power curve by combining the second interval-specific power curves from each interval.

The at least three intervals can include an alactic interval, an anaerobic lactic interval and a lactic interval.

Each maximum value of the first and second power curves can be identified in a session log stored on the non-transitory storage memory.

The first sensor set can include a first sensor pair and the second sensor set can include a second sensor pair.

The first sensor set and the second sensor set can be provided using respective wearable devices, and the respective wearable devices can include footwear.

The footwear can be an insole.

The one or more processors can be configured to degrade the avatar performance metric based on at least one of an asymmetry factor, a smoothness factor, a movement efficiency factor or a training frequency factor determined from the first or second sensor data.

The one or more processors can be configured to degrade the avatar performance characteristic based on at least one of an asymmetry factor, a smoothness factor, a movement efficiency factor or a training frequency factor determined from the first or second sensor data.

The first sensor set can include a plurality of force sensors positioned underfoot of the first user and the first sensor data can include force sensor data from the plurality of force sensors.

The first sensor set can include an IMU positioned on the first user and the first sensor data includes inertial motion data from the IMU.

The avatar performance characteristic can be selected from the group consisting of a running speed, a cycling speed, a skating speed, and a cross-country skiing speed.

The first user performance metric can be a first user pace, the second user performance metric can be a second user pace, and the avatar performance metric can be an avatar pace.

According to some aspects, a non-transitory computer readable medium stores computer-executable instructions, which, when executed by a computer processor, cause the computer processor to carry out a method of generating a virtual avatar representing a plurality of users. The method includes obtaining first sensor data from a first sensor set associated with a first user; determining a first user performance metric from the first sensor data; obtaining second sensor data from a second sensor set associated with a second user; determining a second user performance metric from the second sensor data; generating an avatar performance metric based on the first user performance metric and the second user performance metric; and determining an avatar performance characteristic from the avatar performance metric.

The non-transitory computer readable medium can store computer-executable instructions, which, when executed by a computer processor, cause the computer processor to carry out the method of generating a virtual avatar representing a plurality of users, where the method is described herein.

According to some aspects, a method of generating a virtual avatar representing a plurality of users includes:

obtaining real-time sensor data from a plurality of sensors, the plurality of sensors including a plurality of sensor sets, and each sensor set being associated with a particular user of the plurality of users, wherein the real-time sensor data is obtained while the plurality of users perform a specified activity; determining a plurality of user metrics by, for each particular user determining a corresponding user performance metric based on the real-time sensor data associated with that user; generating an avatar performance metric based on the plurality of user metrics; and determining an avatar performance characteristic from the avatar performance metric.

The method can include determining at least one baseline avatar performance characteristic using historical sensor data corresponding to the plurality of users; and determining the avatar performance characteristic using the at least one baseline avatar performance characteristic and the avatar performance metric.

The at least one baseline avatar performance characteristic can include a modified baseline avatar performance characteristic that is modified using a modification factor determined from the historical sensor data.

Determining the avatar performance characteristic can include determining an updated modification factor by detecting a change in the modification factor based on the real-time sensor data; and adjusting the modified baseline avatar performance characteristic using the updated modification factor in place of the modification factor.

Determining the avatar performance metric can include monitoring the plurality of user metrics for a duration of the specified activity and updating the avatar performance metric based on changes in the user performance metrics resulting from changes in the real-time sensor data.

Determining the avatar performance characteristic can include monitoring the real-time sensor data to determine that the plurality of users have satisfied an activity-specific goal; and adjusting the avatar performance characteristic based on a reward characteristic associated with the activity-specific goal.

The method can include generating an animation of the virtual avatar based on the avatar performance characteristic; and displaying the animation.

The method can include obtaining additional real-time sensor data from an additional plurality of sensors, the additional plurality of sensors including an additional plurality of sensor sets, and each sensor set being associated with an additional user of a plurality of additional users, wherein the additional real-time sensor data is obtained while the plurality of additional users perform the specified activity; determining a plurality of additional user metrics by, for each particular additional user determining a corresponding additional user performance metric based on the additional real-time sensor data associated with that additional user; generating an additional avatar performance metric based on the plurality of additional user metrics; and determining an additional avatar performance characteristic from the additional avatar performance metric.

The method can include generating an additional animation of an additional virtual avatar based on the additional avatar performance characteristic; and displaying the additional animation of the additional virtual avatar and the animation of the virtual avatar within a shared virtual environment.

The method can include defining a shared interactive experience within the shared virtual environment, wherein the shared interactive experience includes a virtual competition; and determining how the virtual avatar and the additional virtual avatar perform in the virtual competition using the avatar performance characteristic and the additional avatar performance characteristic respectively.

According to some aspects, a system for generating a virtual avatar representing a plurality of users includes first and second sensor sets wearable by first and second users, respectively; one or more processors communicatively coupled to the first and second sensors; and a non-transitory storage memory. The one or more processors are configured to: obtain real-time sensor data from a plurality of sensors, the plurality of sensors including a plurality of sensor sets, and each sensor set being associated with a particular user of the plurality of users, wherein the real-time sensor data is obtained while the plurality of users perform a specified activity; determine a plurality of user metrics by, for each particular user determining a corresponding user performance metric based on the real-time sensor data associated with that user; generate an avatar performance metric based on the plurality of user metrics; and determine an avatar performance characteristic from the avatar performance metric.

The one or more processors can be configured to determine at least one baseline avatar performance characteristic using historical sensor data corresponding to the plurality of users; and determine the avatar performance characteristic using the at least one baseline avatar performance characteristic and the avatar performance metric.

The at least one baseline avatar performance characteristic can include a modified baseline avatar performance characteristic that is modified using a modification factor determined from the historical sensor data.

The one or more processors can be configured to determine the avatar performance characteristic by determining an updated modification factor by detecting a change in the modification factor based on the real-time sensor data; and adjusting the modified baseline avatar performance characteristic using the updated modification factor in place of the modification factor.

The one or more processors can be configured to determine the avatar performance metric by monitoring the plurality of user metrics for a duration of the specified activity and updating the avatar performance metric based on changes in the user performance metrics resulting from changes in the real-time sensor data.

The one or more processors can be configured to determine the avatar performance characteristic by monitoring the real-time sensor data to determine that the plurality of users have satisfied an activity-specific goal; and adjusting the avatar performance characteristic based on a reward characteristic associated with the activity-specific goal.

The one or more processors can be configured to generate an animation of the virtual avatar based on the avatar performance characteristic; and display the animation.

The one or more processors can be configured to obtain additional real-time sensor data from an additional plurality of sensors, the additional plurality of sensors including an additional plurality of sensor sets, and each sensor set being associated with an additional user of a plurality of additional users, wherein the additional real-time sensor data is obtained while the plurality of additional users perform the specified activity; determine a plurality of additional user metrics by, for each particular additional user determining a corresponding additional user performance metric based on the additional real-time sensor data associated with that additional user; generate an additional avatar performance metric based on the plurality of additional user metrics; and determine an additional avatar performance characteristic from the additional avatar performance metric.

The one or more processors can be configured to generate an additional animation of an additional virtual avatar based on the additional avatar performance characteristic; and display the additional animation of the additional virtual avatar and the animation of the virtual avatar within a shared virtual environment.

The one or more processors can be configured to define a shared interactive experience within the shared virtual environment, wherein the shared interactive experience includes a virtual competition; and determine how the virtual avatar and the additional virtual avatar perform in the virtual competition using the avatar performance characteristic and the additional avatar performance characteristic respectively.

According to some aspects, a non-transitory computer readable medium stores computer-executable instructions, which, when executed by a computer processor, cause the computer processor to carry out a method of generating a virtual avatar representing a plurality of users. The method includes obtaining real-time sensor data from a plurality of sensors, the plurality of sensors including a plurality of sensor sets, and each sensor set being associated with a particular user of the plurality of users, wherein the real-time sensor data is obtained while the plurality of users perform a specified activity; determining a plurality of user metrics by, for each particular user determining a corresponding user performance metric based on the real-time sensor data associated with that user; generating an avatar performance metric based on the plurality of user metrics; and determining an avatar performance characteristic from the avatar performance metric.

The non-transitory computer readable medium can store computer-executable instructions, which, when executed by a computer processor, cause the computer processor to carry out the method of generating a virtual avatar representing a plurality of users, where the method is described herein.

BRIEF DESCRIPTION OF THE DRAWINGS

The drawings included herewith are for illustrating various examples of articles, methods, and apparatuses of the present specification and are not intended to limit the scope of what is taught in any way. In the drawings.

DETAILED DESCRIPTION

Figure 1:
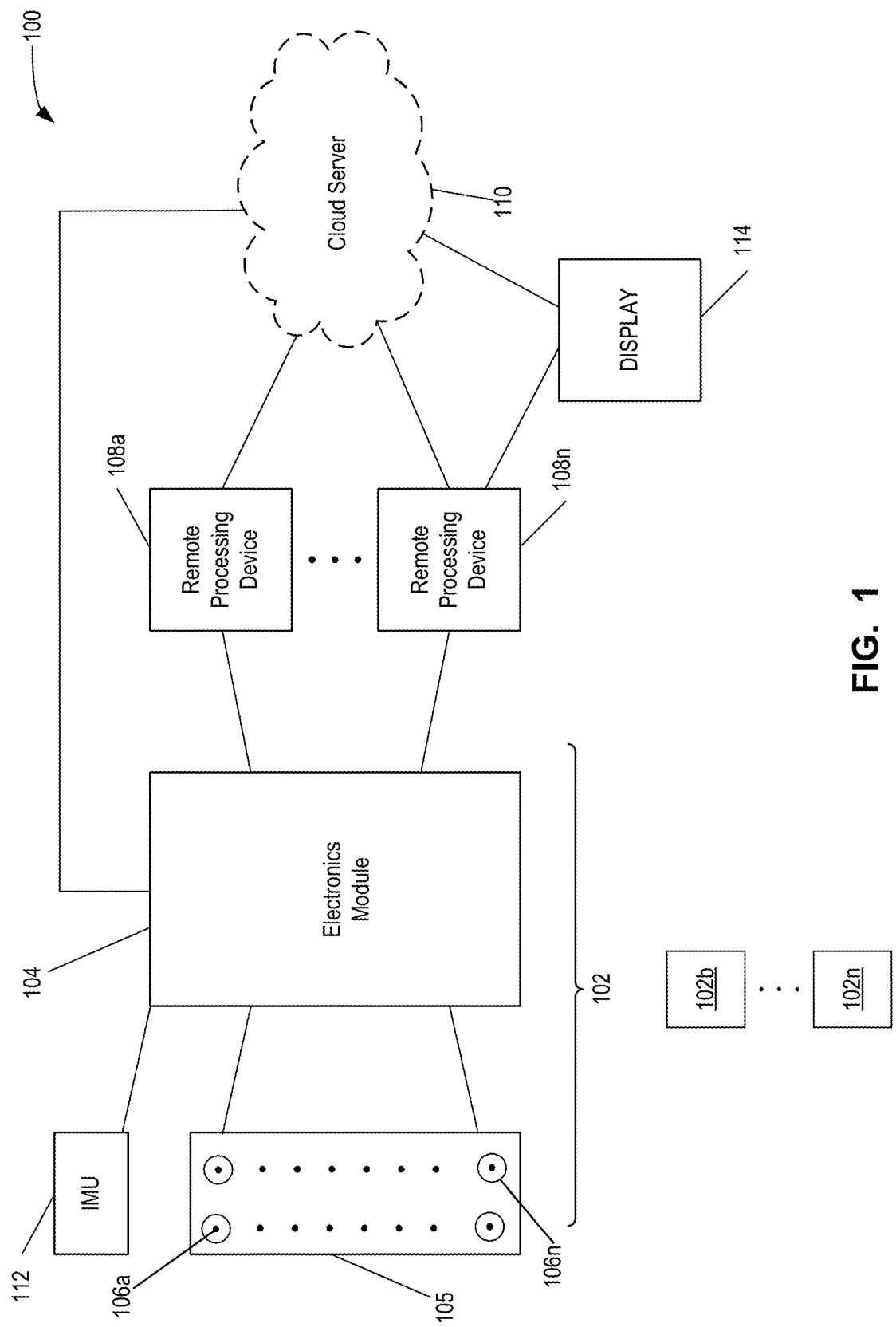
FIG. 1 is a block diagram illustrating an example of a system for generating a virtual avatar representing a plurality of users.

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

Terms of degree such as "substantially", "about", and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

Described herein are systems, methods and devices for generating a virtual avatar representing a plurality of users. The virtual avatar can be defined to represent a group of users who have performed, or are performing, an activity or other movement.

The systems, methods and devices described herein can determine performance metrics for each user using sensor data received from sensors positioned to measure data from that user. The systems, methods, and devices can in some examples use sensors attached to, or contained within, wearable devices or fitness equipment to measure and monitor data relating to movement or activity of the user. The measured data from the sensors can be used to calculate user metrics related to the user's performance of an activity.

The user metric data collected from a plurality of contributing users can be used to generate an avatar metric. The avatar metric can be used to determine an avatar performance characteristic for a virtual avatar that represents the contributing users. The avatar performance characteristic can be used to determine how the virtual avatar performs in a virtual activity such as a simulation of a real-world activity or a virtual competition.

The users can, in effect, combine or cooperate to provide a combined avatar that represents the plurality of users collectively. This combined avatar can be rendered and animated within a virtual environment that can be displayed for the plurality of users as well as other individuals. The virtual avatar allows contributing users to collectively engage in a virtual interactive experience within the virtual environment. The animation of the combined virtual avatar can be determined based on the avatar performance characteristic derived from the avatar performance metric (which is, in turn, derived from the individual performance metrics of the plurality of users).

The systems, methods, and devices described herein may be implemented as a combination of hardware or software. In some cases, the systems, methods, and devices described herein may be implemented, at least in part, by using one or more computer programs, executing on one or more programmable devices including at least one processing element, and a data storage element (including volatile and non-volatile memory and/or storage elements). These devices may also have at least one input device (e.g. a pushbutton keyboard, mouse, a touchscreen, a foot-operated controller, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C, for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

The present disclosure relates in general to a system, method, and device that can be used to generate virtual avatars that provide a collective representation of a plurality of contributing users. The term "contributing users" generally refers to a group of users who are associated with the same virtual avatar. Sensor data (and optionally other biometric data) is obtained from each contributing user in order to generate the virtual avatar.

The system, method and device described herein can use sensors mounted to the users to collect sensor data relating to the user's performance in one or more activities. Users may participate in various different types of activities while the sensors are mounted thereto. For example, users may participate in cyclic activities in which a movement is repeated over and over. Examples of cyclic activities can include walking, race-walking, running, cycling, skating, cross-country skiing, swimming, weightlifting, rowing, various track and field events and so forth.

The sensors can include force sensors. The force sensors can be positioned underfoot of the corresponding contributing user. For example, force sensors can be provided in the insole of a shoe or within the footwear worn by the individual. The force data acquired by the force sensors can be used to determine the level of force applied by an individual's foot when performing activities such as walking, running, jumping or cycling for example. This force data can be used to derive additional force derivatives or force-based metrics, such as the force output, mean force, peak force, power and so forth for the individual.

Directly measuring the force (or pressure) applied by an individual using underfoot force sensors (as opposed to deriving the force data from other sensors such as accelerometers) can contribute to more accurate calculations of force-related metrics such as power. As used herein, the term "force" is used broadly and can refer to raw force (i.e. with units of N), or pressure resulting from a raw force (i.e. with units of $N/m^2$).

The sensors can also include one or more inertial measurement units (IMUs). The IMUs can be positioned at various locations on the corresponding contributing user. IMU data from the one or more IMUs can be used to derive additional IMU-based metrics.

The sensor data from each user can be used to determine one or more performance metrics for that user. Various different performance metrics can be determined for a user, such as user power, user pace, and so forth. The user performance metrics can provide a measurable indication of how well the user is performing in a given activity or in an aspect of a given activity.

For example, force sensor data can be used to determine a mechanical running power metric or mechanical cycling power metric using force sensor data from a plurality of force sensors positioned underfoot. Alternatively or in addition, a running speed or cadence metric may be determined wholly or partially using IMU data.

Optionally, a set of force sensors can be associated with a corresponding IMU. The corresponding IMU can be configured to collect inertial measurement data relating to movement of the same foot under which the force sensors are positioned. This can facilitate the determination of performance metrics based on a combination of force sensor data and IMU data. For instance, certain user metrics may be determined using a combination of force sensor data and IMU data.

The performance metrics from the contributing users can be used to determine an avatar performance metric. The avatar performance metric can be determined as a function of the performance metrics from the plurality of contributing users associated with the virtual avatar.

The avatar performance metric can be used to select an avatar performance characteristic for the virtual avatar. The avatar performance characteristic can specify how the virtual avatar performs within a virtual environment. The avatar performance characteristic can be determined as a function of the avatar performance metric. Optionally, the avatar performance characteristic can be determined as a function of the avatar performance metric and one or more modification factors.

Modification factors generally refer to factors that can affect the avatar's performance apart from user performance metrics alone. Modification factors can be determined based on various different inputs including sensor data from the contributing users (user modification factors) as well as past training and performance data representing the previous activities of the contributing users and/or the avatar in the virtual environment (historical modification factors).

The user modification factors can be determined based on sensor data indicating whether a contributing user is performing an activity with proper technique and/or general health and wellness data for the user. For example, sensor data indicating that a user is performing an activity with sub-optimal technique may degrade the performance of the corresponding virtual avatar. This can encourage users to perform activities at a high level while still maintaining proper technique. Various different examples of user modification factors may be determined, such as a user symmetry modification factor, a user balance modification factor, a user flexibility modification factor, a user heartrate modification factor, a user strength modification factor, a user jump height modification factor, a user smoothness modification factor, a movement efficiency modification factor, and/or a user nutrition modification factor.

The historical modification factors can include user historical modification factors. The user historical modification factors can be determined based on historical training data indicating the training frequency and pattern for the contributing user. For example, historical training data indicating infrequent training by the contributing users or an extended period without training by the contributing users may degrade the performance characteristic of the virtual avatar. Optionally, periods of overtraining may also degrade the performance characteristics of the virtual avatar. This may encourage users to train on a regular basis while observing safe training patterns and frequencies.

The historical modification factors can include avatar historical modification factors. The avatar historical modification factors can be determined based on historical activity data indicating the historical activity participation of the virtual avatar. For example, an extended period without participation in any virtual activities may degrade the performance characteristic of the virtual avatar. This may encourage users to participate in virtual activities on a more frequent basis.

The modification factors can be used to modify the avatar performance characteristics in various ways. For instance, modification factors may be applied to adjust the user performance metrics determined for individual users. Alternatively or in addition, modification factors may be applied to adjust the avatar performance metrics determined for the virtual avatar. Alternatively or in addition, modification factors may be applied to adjust the avatar performance characteristic determined for the avatar.

An animation of the virtual avatar can be generated based on the avatar performance characteristic. The animation can then be displayed to the contributing users (and possibly other users) as part of a virtual interactive experience.

For example, a virtual interactive experience may include a virtual competition between multiple avatars. The virtual competition can involve multiple virtual avatars participating in a competitive activity within a shared virtual environment. The animation can provide a visual representation of how the virtual avatars perform in the virtual activity based on respective performance characteristics.

The avatar performance characteristic may be determined based on historical sensor data obtained from the plurality of users. That is, the sensor data from the contributing users can be used to determine performance attributes of the avatar similar to ratings or attributes of a character in a video game.

The virtual avatar can then perform in the virtual interactive experience on the basis of these pre-defined performance attributes.

Alternatively or in addition, the avatar performance characteristic may be determined based on sensor data obtained from the contributing users in real-time. For example, sensor data can be obtained from contributing users performing specified activities (e.g. running, cycling etc.). The sensor data can be analyzed in real-time to determine user performance metrics, avatar performance metrics, and avatar performance characteristics. This may allow users to cooperatively participate in real-time virtual interactive experiences with other contributing users (and competitively against contributing users corresponding to other virtual avatars).

In some examples, the avatar performance characteristic may be determined based on a combination of real-time sensor data and historical sensor data. For instance, the historical sensor data can be used to define a baseline avatar performance characteristic (e.g. as a set of avatar attributes). The baseline avatar performance characteristic may in effect establish a predefined range of performance characteristics that can be achieved by the virtual avatar. The real-time sensor data may then be used to determine how the virtual avatar performs within these predefined ranges. Optionally, the real-time sensor data may be used to modify the baseline avatar performance characteristic, for instance where the real-time sensor data indicates that users are performing an activity with improved technique.

Referring now to FIG. 1, shown therein is a block diagram illustrating an example system 100 that can be used to generate a virtual avatar representing a plurality of users. System 100 includes a plurality of input units 102a-102n (also referred to herein as an input device), one or more processing devices 108 (also referred to herein as a receiving device or an output device), an optional remote cloud server 110 and a display 114.

The plurality of input units 102a-102n can be associated with a corresponding plurality of users. The plurality of users can be a group of contributing users associated with a particular virtual avatar. In some cases, the plurality of users can include multiple groups of contributing users associated with different virtual avatars.

Each input unit 102 can be associated with one of the users. Each input unit 102 generally includes a corresponding sensor set. The input unit 102 can obtain sensor data from the associated user using the corresponding sensor set. For example, a first input unit 102a can include a first sensor set configured to obtain sensor data from a first user, a second input unit 102b can include a second sensor set configured to obtain sensor data from a second user, and so forth.

The set of sensors for each input unit 102 can include one or more sensors configured to obtain measurements of various parameters relating to human movement or human activity. For example, the set of sensors can include force sensors operable to measure a force applied by the corresponding user.

Alternatively or in addition, the set of sensors can include an inertial measurement unit operable to measure various parameters relating to movement by the corresponding user.

Alternatively or in addition, various other types of sensors may be included in the sensor set of an input unit 102, such as, for example, a shear sensor, a weight sensor, a body-mass-index sensor, a temperature sensor, a moisture sensor, a heart rate sensor, a heart rate variability sensor, a blood pressure sensor, a blood flow sensor, a cardiac output sensor, a perfusion sensor, an inductance sensor, an odor sensor, a taste sensor, a hydration sensor, a respiratory flow rate sensor, a limb positioning measurement device, a chemical marker sensor, a blood glucose sensor, a sweat sensor, a blood alcohol sensor, an oxygen sensor, a carbon dioxide sensor, a drug level sensor, an electrolyte sensor, a pH sensor, an acidity sensor, an EEG sensor, an EMG sensor, an ECG sensor, a lung function meter, an impairment sensor, a sleep sensor, a body fat sensor, a height sensor, a fatigue sensor, a facial recognition sensor, a voice sensor, an emotion sensor, a stress sensor, an endorphin sensor, a cortisol sensor, an adrenaline sensor, an infrared sensor, a bacterial load sensor, a motion capture sensor, a timer, a weather sensor, a GPD sensor, an audio sensor, a light sensor, an altimeter, radar, lidar, a milestone sensor, an equipment-based sensor, a proximity sensor, and so on.

In the example illustrated, input unit 102a includes a force sensing unit 105 containing a plurality of force sensors 106a-106n and an inertial measurement unit 112.

Optionally, the sensor set included in an input unit 102 may include multiple force sensing units 105 and/or inertial measurement units 112 for the same user (e.g. to obtain sensor data from different locations on the user). For example, the sensor set included in an input unit 102 may include a separate sensing unit 105 (and optionally a separate IMU 112) for each foot of an individual. The sensor set may include a first force sensing unit 105 associated with a first foot of the user and a second force sensing unit 105 associated with the second foot of the user.

Alternatively, a single sensing unit 105 may be used to acquire force sensor data for both feet of an individual. This may be the case where the sensing unit 105 is incorporated into fitness equipment such as an exercise mat or treadmill. In such cases, the force sensor data acquired by the sensing unit 105 may be associated with individual feet through further processing by electronics module 104 and/or processing device 108.

The sensor set included in an input unit 102 may also include one or more inertial measurement units 112 mounted at respective locations on the user.

Optionally, the sensor set included in the input unit 102 can include an inertial measurement unit 112 associated with each force sensing unit. This may allow IMU sensor data and force sensor data to be obtained from the same location on the user's body. IMU data acquired by the IMU 112 associated with each foot may be used to associate the force sensor data acquired by a single sensing unit 105 with the corresponding foot.

Optionally, the IMU 112 can also be positioned underneath an individual's foot. This may be the case, for instance, where IMU 112 and force sensing unit 105 are associated and provided as a combined sensor unit. However, the IMU 112 need not be positioned underfoot so long as the IMU 112 can collect inertial measurement data relating to the user's movement or motion as required by the particular application.

Alternatively or in addition, the sensor set included in the input unit 102 can include one or more inertial measurement units 112 at locations where no force sensors are present. This may allow IMU sensor data to be obtained relating to movement by a user at locations where forces may not be applied (or applied directly in a manner that would be detectable to a force sensor).

Optionally, an input unit 102 may include multiple electronic modules 104. Each electronic module 104 may be associated with a different subset of sensors within the corresponding sensor set included in the input unit 102.

The plurality of force sensors 106a-106n in a force sensing unit 105 can be configured to collect force sensor data from a user. For example, the plurality of force sensors 106 can be positioned underfoot of an individual performing an activity or other type of movement.

An IMU 112 can include one or more sensors for measuring the position and/or motion of the wearable device. For example, IMU 112 may include sensors such as one or more of a gyroscope, accelerometer (e.g., a three-axis accelerometer), magnetometer, orientation sensor (for measuring orientation and/or changes in orientation), angular velocity sensor, and inclination sensor. Generally, IMU 112 includes at least an accelerometer. The IMU 112 also typically includes a gyroscope.

The sensors may be provided using a wearable device and/or fitness equipment. As will be described in further detail below, each input unit 102 may for example be provided using (e.g. combined with, or integrated into) one or more carrier units such as one or more wearable devices and/or pieces of fitness equipment.

The carrier unit can be configured to position the sensors (e.g. force sensors 106 and/or IMU 112) in contact with (or in close proximity to) an individual's body to allow the sensors to measure an aspect of the activity being performed by the individual. The plurality of sensors may be configured to measure a particular sensed variable at a location of an individual's body when the carrier unit is engaged with the individual's body (e.g. when the individual is wearing a wearable device containing the sensors or when the individual is using fitness equipment containing the sensors).

In some examples, a carrier unit may include one or more wearable devices. The wearable devices can be manufactured of various materials such as fabric, cloth, polymer, or foam materials suitable for being worn close to, or in contact with, a user's skin. All or a portion of the wearable device may be made of breathable materials to increase comfort while a user is performing an activity.

In some examples, the wearable device may be formed into a garment or form of apparel such as a band, a watch, an arm mount, an ankle mount (e.g. a Stryd pod), headwear, a shirt, shorts, a sock, a shoe, a sleeve, and a glove (e.g. a tactile glove). Some wearable devices such as socks or sleeves may be in direct contact with a user's skin. Some wearable devices, such as shoes, may not be in direct contact with a user's skin but still positioned within sufficient proximity to a user's body to allow the sensors to acquire the desired readings.

In some cases, the wearable device may be a compression-fit garment. The compression-fit garment may be manufactured from a material that is compressive. A compression-fit garment may minimize the impact from "motion artifacts" by reducing the relative movement of the wearable device with respect to a target location on the individual's body. In some cases, the wearable device may also include anti-slip components on the skin-facing surface. For example, a silicone grip may be provided on the skin-facing surface of the wearable device to further reduce the potential for motion artifacts.

In some examples, the wearable device can be worn on a foot. For example, the wearable device may be a shoe, a sock, or an insole, or a portion of a shoe, a sock, or an insole. The wearable device may include a deformable material, such as foam. This may be particularly useful where the wearable device is a shoe or insole.

The plurality of sensors can be positioned to acquire sensor readings from specified locations on an individual's body (via the arrangement of the sensors on the carrier unit). The sensors can be integrated into the material of the carrier unit (e.g. integrated into a wearable device or fitness equipment). Alternatively, the sensors can be affixed or attached to the carrier unit, e.g. printed, glued, laminated or ironed onto a surface, or between layers, of a wearable device or fitness equipment.

In some examples, the carrier unit may include fitness equipment. The fitness equipment may include various types of fitness equipment on which a user can exert force while performing an activity. For example, the carrier unit may be fitness equipment such as an exercise mat, a fitness bench, a bar (e.g. a squat rack or a pull-up bar), a treadmill, or a bicycle seat for a bicycle or stationary bicycle.

In system 100, the plurality of force sensors 106a-106n can be arranged to measure force underneath the foot (underfoot) of an individual. For clarity, the below description relates to a carrier unit in the form of an insole. The insole carrier unit may be provided in various forms, such as an insert for footwear, or integrated into a shoe. However, other carrier units may be implemented using the systems and methods described herein, such as the wearable devices and fitness equipment described above.

Incorporating the sensor set into a carrier unit in the form of a wearable device may be desirable as it allows sensor data to be obtained from a user at various locations and without requiring specifically configured fitness equipment. This may allow users to participate in virtual events, or to contribute sensor data usable for determining an avatar performance characteristic, at many different locations (e.g. including indoor and outdoor locations).

The below description relates to an insole in which the plurality of sensors 106 are force sensors. Various types of force sensors may be used, such as force sensing resistors (also referred to as sensing elements), pressure sensors, piezoelectric tactile sensors, elasto-resistive sensors, capacitive sensors or more generally any type of force sensor that can be integrated into a wearable device or fitness equipment capable of collecting force data underfoot.

The plurality of force sensors 106 may be arranged into a sensor array. As used herein, the term sensor array refers to a series of sensors arranged in a defined grid. The plurality of force sensors 106 can be arranged in various types of sensor arrays. For example, the plurality of force sensors 106 can be provided as a set of discrete sensors (see e.g. FIG. 2). A discrete sensor is an individual sensor that acquires a sensor reading at a single location. A set of discrete sensors generally refers to multiple discrete sensors that are arranged in a spaced apart relationship in a sensing unit.

Sensors 106a-106n may be arranged in a sparse array of discrete sensors that includes void locations where no sensors 106 are located. Alternatively, sensors 106a-106n may be arranged in a continuous or dense sensor array in which sensors 106 are arranged in a continuous, or substantially continuous manner, across the grid.

Discrete sensors can provide an inexpensive alternative to dense sensor arrays for many applications. However, because no sensors are positioned in the interstitial locations between the discrete sensors and the void locations external to the set of discrete sensors, no actual sensors readings can be acquired for these locations. Accordingly, depending on the desired resolution for the force sensor data, sensor readings may be estimated (rather than measured) at the interstitial locations and at the void locations external to the set of discrete sensors in order to provide sensor data with similar resolution to a dense sensor array. Alternatively, where lower resolution force sensor data is sufficient, sensor readings may not necessarily be estimated.

Various interpolation and extrapolation techniques may be used to estimate sensor values at interstitial locations and external void locations. In some cases, sensor values may be estimated using the methods for synthesizing sensor data described in Applicant's co-pending patent application Ser. No. 17/988,468 filed on Nov. 16, 2022 entitled "SYSTEM AND METHOD FOR SYNTHESIZING SENSOR READINGS", the entirety of which is incorporated herein by reference. In some cases, sensor values may be estimated using the methods for synthesizing sensor data described in Applicant's co-pending patent application Ser. No. 18/183,642 filed on Mar. 14, 2023 entitled "SYSTEM AND METHOD FOR DETERMINING USER-SPECIFIC ESTIMATION WEIGHTS FOR SYNTHESIZING SENSOR READINGS", the entirety of which is incorporated herein by reference.

System 100 can be configured to implement a method of generating a virtual avatar. The method of generating a virtual avatar may be implemented using a controller of the input device 102, a remote processing device 108, and/or cloud server 110.

As shown in FIG. 1, input unit 102 includes an electronics module 104 coupled to the plurality of sensors 106 and to IMU 112. In some cases, the electronics module 104 can include a power supply, a controller, a memory, a signal acquisition unit operatively coupled to the controller and to the plurality of sensors 106 (and to IMU 112), and a wireless communication module operatively coupled to the controller.

Generally, the sensing unit refers to the plurality of sensors and the signal acquisition unit. The signal acquisition unit may provide initial analog processing of signals acquired using the sensors, such as amplification. The signal acquisition unit may also include an analog-to-digital converter to convert the acquired signals from the continuous time domain to a discrete time domain. The analog-to-digital converter may then provide the digitized data to the controller for further analysis or for communication to a remote processing device 108 or remote cloud server 110 for further analysis.

Optionally, the electronics module 104 may include a controller or other processing device configured to perform the signal processing and analysis. In such cases, the controller on the electronics module may be configured to process the received sensor readings. In some cases, the controller may be coupled to the communication module (and thereby the sensing unit) using a wired connection such as Universal Serial Bus (USB) or other port.

The electronics module 104 can be communicatively coupled to one or more remote processing devices 108a-108n, e.g. using a wireless communication module (e.g., Bluetooth, Bluetooth Low-Energy, WiFi, ANT+IEEE 802.11, etc.). The remote processing devices 108 can be any type of processing device such as (but not limited to) a personal computer, a tablet, a gaming system, and a mobile device such as a smartphone, a smartwatch or a wristband. The electronics modules 104 can also be communicatively coupled to remote cloud server 110 over, for example, a wide area network such as the Internet.

Each remote processing device 108 and optional remote cloud server 110 typically includes a processing unit, an output device (such as a display, speaker, and/or tactile feedback device), a user interface, an interface unit for communicating with other devices, Input/Output (I/O) hardware, a wireless unit (e.g. a radio that communicates using CDMA, GSM, GPRS or Bluetooth protocol according to standards such as IEEE 802.11a, 802.11b, 802.11g, or 802.11n), a power unit, and a memory unit. The memory unit can include RAM, ROM, one or more hard drives, one or more flash drives or some other suitable data storage elements such as disk drives, etc.

The processing unit controls the operation of the remote processing device 108 or the remote cloud server 110 and can be any suitable processor, controller or digital signal processor that can provide sufficient processing power depending on the desired configuration, purposes and requirements of the system 100.

The display 114 can be any suitable display that provides visual information. For instance, the display 114 can be a cathode ray tube, or a flat-screen monitor and the like if the remote processing device 108 or remote cloud server 110 is a desktop computer. In other cases, the display 114 can be a display suitable for a laptop, tablet or handheld device, such as an LCD-based display and the like. In still other cases, the display 114 can be a display suitable for a virtual-reality or augmented reality system, such as a virtual reality headset or smart glasses for example. Although only one display 114 is shown, it should be understood that there may be multiple displays in system 100. For example, each user may have an associated display 114.

System 100 can generally be used for determining avatar metrics and performance characteristics based on user metrics determined from sensor readings received from a plurality of sensor sets corresponding to a plurality of users. In some cases, system 100 may also track additional data derived from the sensor readings, such as modification factors that can be used to modify the avatar metrics and/or performance characteristics. The sensor readings, user metrics, avatar metrics, avatar performance characteristics, modification factors and other derived data may be monitored, stored, and analyzed for the plurality of users. Optionally, the sensor readings, user metrics, avatar metrics, avatar performance characteristics, modification factors and other derived data can be used to animate and display a virtual avatar in real-time.

Aspects of the monitoring, storage and analysis of biometric features and other metrics may be performed by one or more of the input unit 102, and/or a remote processing device 108, and/or the cloud server 110. For example, a non-transitory storage memory of one or more of the input unit 102, and/or a remote processing device 108, and/or the cloud server 110 can store various user and avatar related data such as session logs containing sensor data from the contributing users, user historical training data for each contributing user and/or historical activity data for a virtual avatar and/or avatar performance metrics.

A remote cloud server 110 may provide additional processing resources not available on the input unit 102 or the remote processing device 108. For example, some aspects of processing the sensor readings acquired by the sensors 106 may be delegated to the cloud server 110 to conserve power resources on the input unit 102 or remote processing device 108. The cloud server 110, input unit 102 and remote processing device 108 may communicate in real-time to select avatar performance characteristics and animate a virtual avatar for display by display 114.

Figure 2:
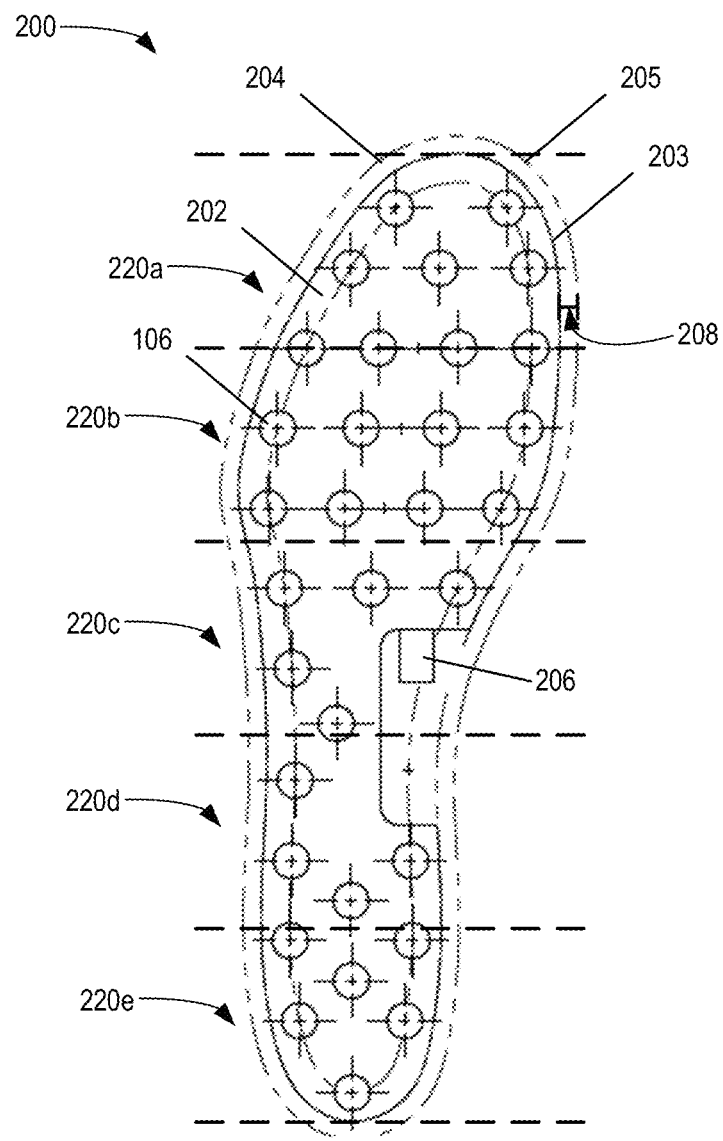
FIG. 2 is a diagram illustrating an example of a wearable device incorporating a sensing unit that can be used in the system of FIG. 1.

Referring now to FIG. 2, shown therein is an example of an insole 200 that includes a sensing unit 202. The insole 200 is an example of a sensing unit that may be included in an input device 102 in the system 100 shown in FIG. 1. The insole 200 may be the footwear insert described in PCT Application No. PCT/CA2020/051520, the entirety of which is incorporated herein by reference.

The insole 200 includes a sensor unit 202 and an optional liner 204. The liner 204 can provide a protective surface between the sensor unit 202 and an individual's foot. The liner 204 may have a slightly larger profile as compared to the sensor unit 202. That is, the outer perimeter 203 of the sensor unit 202 may be inwardly spaced from the outer perimeter 205 of the liner 204 by an offset 208. The offset 208 may be substantially consistent throughout the perimeter of the sensor unit 202 such that the sensor unit 202 is completely covered by the liner 204.

Optionally, the sensor unit 202 can include an IMU (not shown). The sensor unit 202 can also include a connector 206. The connector 206 may provide a coupling interface between the plurality of force sensors 106 (and the optional inertial measurement unit) and an electronics module (not shown) such as electronics module 104. The coupling interface can allow signals from the force sensors 106 and/or IMU to be transmitted to the electronics module. In some cases, the coupling interface may also provide control or sampling signals from the electronics module to the force sensors 106 and/or IMU.

The arrangement of force sensors 106 in the sensor unit 202 is an example of a sparse sensor array that may be used to collect force sensor data. In alternative examples, various different types of force sensors, force sensor arrays, and arrangements of force sensors may be used. For example, sensor units containing a dense force sensor array (e.g. a Pedar® insole or Tekscan® system) may also be used.

Figure 3:
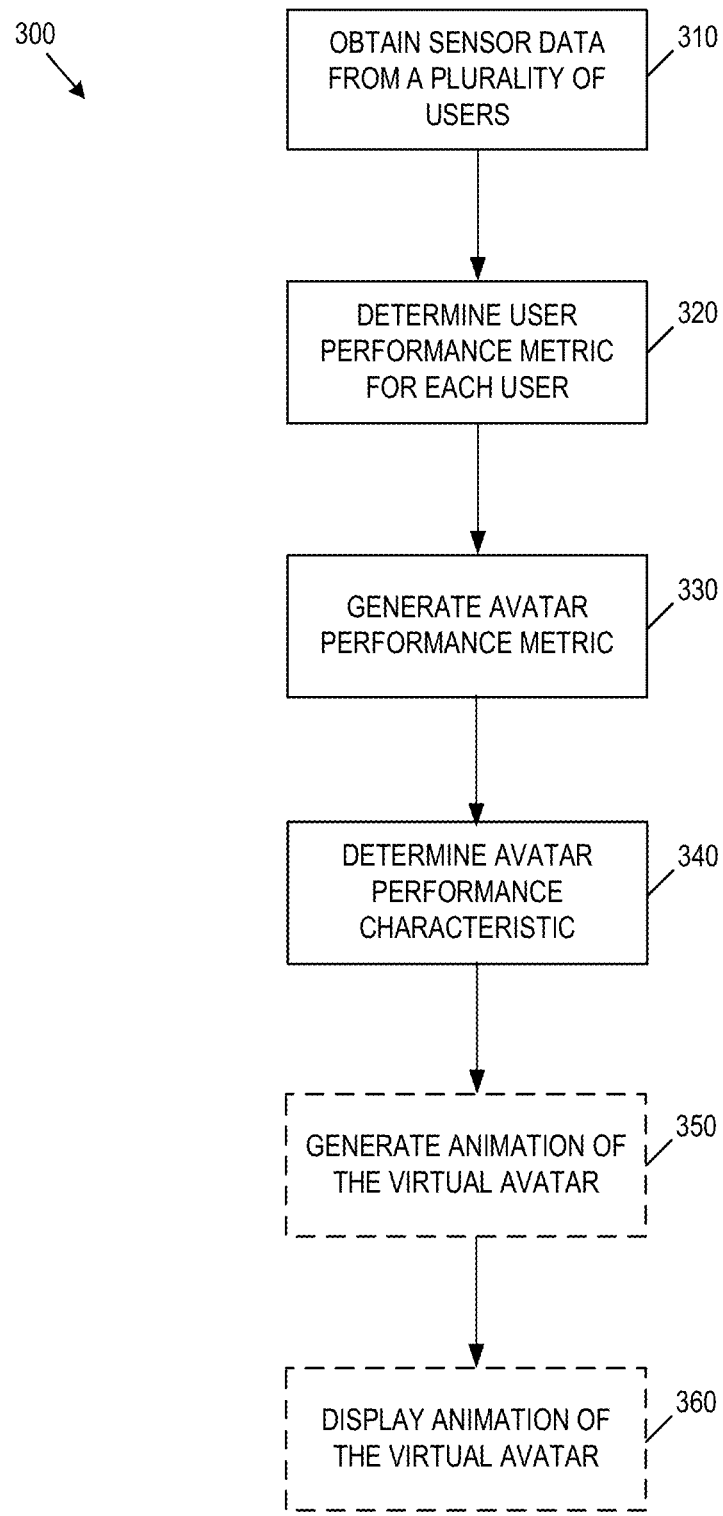
FIG. 3 is a flowchart illustrating an example of a method for generating a virtual avatar representing a plurality of users.

Referring now to FIG. 3, shown therein is an example method 300 for generating a virtual avatar representing a plurality of users. The method 300 may be used with a plurality of sensors configured to measure human movement or human activity, such as force sensors 106 and/or IMU 112. Method 300 is an example of a method for generating a virtual avatar in which sensor readings acquired from a plurality of users are used to determine an avatar performance metric and corresponding avatar performance characteristic. The avatar performance characteristic can be used to generate a virtual avatar representing the plurality of users.

At 310, sensor data can be obtained from a plurality of users. Each user can have an associated sensor set (i.e. sensors arranged to obtain sensor data from the respective users). The sensor data can be obtained from the sensor set associated with each user.

The sensors can be positioned at specified locations on a carrier unit such as a wearable device or a piece of equipment. The sensors can be configured to measure data relating to human movement or activity. For each user, a plurality of sensor readings can be obtained from the sensors in the corresponding sensor set associated with that user.

For example, the sensor set can include a plurality of force sensors positioned to obtain sensor data from a user while performing an activity. For example, the sensors can be provided using one or more corresponding carrier units.

The sensor data can include a plurality of force sensor readings obtained from a corresponding plurality of force sensors. The plurality of force sensors can be configured to acquire force sensor data from the user. The sensor data for that user can thus include the force sensor data from the plurality of force sensors.

The plurality of force sensors may be positioned underfoot (i.e. underneath the foot) of a user performing a physical activity. The force sensors can thus measure the force applied by the user's foot while performing the physical activity.

As shown in FIG. 2, the plurality of sensors may be force sensors provided at various locations of an insole. The force sensors can measure force applied to the insole during physical activities, such as walking, running, jumping, or cycling for example.

The sensor set may also include one or more IMUs. The sensor data acquired at 310 can include IMU sensor data received from the one or more IMUs.

The sensor data acquired at 310 may be acquired as a time-continuous set of sensor readings. This may provide a time-continuous set of sensor data that can be used to determine user performance metrics as time-continuous metrics and/or average metric values. Depending on the nature of the sensors and the signal preprocessing performed, the time-continuous sensor data may be discretized, e.g. using an analog to digital conversion process. Even where the sensor data is discretized, the set of sensor data may allow the user performance metrics to be determined as a (discretized) time-continuous metric and/or an average metric value.

The sensor data can be obtained from at least two users. First sensor data can be obtained from a first sensor set associated with a first user. Second sensor data can be obtained from a second sensor set associated with a second user.

The plurality of users may also include at least one additional user in addition to the first and second users. In such cases, at least one additional sensor data can be obtained from the at least one additional sensor set associated with the at least one additional user.

More generally, the sensor data obtained at 310 can be obtained from a plurality of contributing users associated with the same virtual avatar. Contributing users can be associated with the same virtual avatar in various ways. Users may elect to form avatar groups or teams e.g. through a graphical user interface provided on a browser-based application or mobile app. Users who form part of the same avatar group or team can thus be associated with the virtual avatar for that avatar group or team. For example, users may form teams with other users they know in order to participate cooperatively in virtual interactive experiences.

Alternatively or in addition, users may be associated with virtual avatars automatically. For example, users may be randomly associated with virtual avatars. This may allow users to participate in virtual interactive experiences without needing to know any other users. Alternatively, users can be automatically associated with virtual avatars based on user data, such as location data (e.g. a Canadian virtual avatar, American virtual avatar) or demographic data (e.g. a female virtual avatar, or a teenage virtual avatar) for example.

The sensor data can be obtained while users participate in various different types of activities. The activities can be cyclic activities. Cyclic activities generally refer to activities or sports in which a movement is repeated over and over (e.g. walking, race-walking, running, cycling, skating, speed skating, cross-country skiing, swimming, weightlifting, rowing, various track and field events and so forth).

In some cases, the sensor data from the various users may be collected at different times. For example, sensor data can be obtained from individual users performing activities at different times. The sensor data can subsequently be used in determining user metrics as well as metrics and performance characteristics of the associated virtual avatar.

As noted above, the sensor data can be collected from multiple users associated with the same virtual avatar. However, when the sensor data is not collected and used in real-time to determine an avatar performance characteristic, there is no requirement that a user be associated with a particular virtual avatar at the time the sensor data is collected. Rather, the sensor data may be obtained from multiple users prior to those users being associated with any particular virtual avatar.

In addition, users can be associated with different avatars at different points in time. Over time different users may become associated with or no longer associated with various different virtual avatars.

The sensor data can include at least one session sensor dataset from each user. A session sensor dataset refers to the sensor data obtained from the corresponding user during a single collection session (e.g. during a single session in which the user is performing an activity).

Optionally, the sensor data obtained at 310 can include multiple session sensor datasets for one or more users. The sensor data obtained at 310 can thus include sensor data from multiple different sessions in which a given user was performing the same activity or even different activities.

Optionally, the sensor data can be obtained from the plurality of users in real-time. In such cases, users can be associated with the corresponding virtual avatars when the sensor data is obtained.

When sensor data is obtained from the plurality of users in real-time, an initial synchronization step may be performed in order to synchronize the sensor data being obtained from multiple users. For instance, users may synchronize their processing devices and/or sensor sets prior to sensor data collection to ensure that sensor data is being sampled at the same time for each user.

Optionally, the synchronization process can also include synchronizing the frequency of sensor data collection for each user. This may facilitate the real-time use of the sensor data to determine avatar metrics and performance characteristics.

Alternatively, the synchronization process may be omitted even for real-time data collection from multiple users. Optionally, in such cases, the sensor data from the plurality of users may be adjusted temporally in order to align the sensor datasets among users.

At 320, a user performance metric can be determined for each user. The user performance metric for a given user can be determined based on the sensor data obtained at 310 for that user.

Various different types of performance metrics may be determined. The performance metric can provide a quantitative value or set of values representing how well the corresponding user is performing for a particular activity.

For example, the user performance metric may be determined as a user power curve metric. The user power curve metric may be a critical power curve that defines a maximum power that the user can exert for a specified duration of time.

Alternatively or in addition, the user performance metric can include a user pace metric. The user pace metric can be defined as the rate of movement of the user while performing the specified activity. For instance, the user pace may be identified as the user's running speed while performing a running activity or as the user's cadence when performing a cycling activity.

Examples of user performance metrics and how user performance metrics are derived from sensor data are described in further detail herein below with reference to step 410 of method 400.

At 330, an avatar performance metric can be generated based on the user performance metrics determined at 320. The avatar performance metric can be generated as a function of the user performance metrics. The avatar performance metric can be the same type of metric as the user performance metric determined at 320 (e.g. a power curve metric, a pace metric, etc.).

The avatar performance metric can be generated by selectively combining the user performance metrics determined at 320. The user performance metrics can be combined in various ways to generate the avatar performance metric.

For example, the avatar performance metric can be generated using an average of the user performance metrics associated with the plurality of contributing users. Alternatively or in addition, the avatar performance metric can be generated using a maximum or best performance metric from the user performance metrics associated with the plurality of contributing users.

Optionally, the user performance metrics from different users may be assigned different weights prior to determining the avatar performance metric. For example, user performance metrics from users who have completed a higher number of data collection sessions may be assigned higher weight values than user performance metrics from users who have completed a lesser number of data collection sessions. These weightings can be applied to the corresponding user performance metrics when they are being combined to generate the avatar performance metric.

An example process of generating an avatar performance metric is described in further detail herein below with reference to step 430 of method 400.

Optionally, one or more modification factors can be applied in order to generate the avatar performance metric. Examples of modification factors are described in further detail herein below at step 420 of method 400.

Modification factors may be applied to adjust the values of user performance metrics prior to those user performance metrics being used to generate the avatar performance metric. Alternatively or in addition, modification factors can be applied to the avatar performance metric after combining the user performance metrics to adjust the value of the avatar performance metric.

At 340, an avatar performance characteristic can be determined from the avatar performance metric determined at 330. The avatar performance characteristic can specify how a virtual avatar will perform in a particular virtual activity. For example, the avatar performance characteristic may be an avatar speed for a specified activity such as a running speed, a cycling speed, a skating speed, a cross-country skiing speed and so forth.

Optionally, the avatar performance characteristic can be determined based on the avatar performance metric determined at 330 and one or more modification factors.

For example, avatar historical modification factors can be determined based on historical activity data indicating the historical activity participation of the virtual avatar. The avatar performance characteristic can be determined as a function of the avatar performance characteristic from 330 and one or more avatar historical modification factors.

Optionally, at 350, an animation of the virtual avatar can be generated based on the avatar performance characteristic. The animation of the virtual avatar can include the virtual avatar performing a specified activity within a virtual environment. The manner in which the virtual avatar performs the specified activity, and the level of their performance, can be determined using the avatar performance characteristic from 340.

Animating the virtual avatar can also include defining a virtual physical appearance for the virtual avatar. The virtual physical appearance for the virtual avatar can be determined based on a plurality of avatar physical attributes determined for the virtual avatar.

Optionally, the avatar physical attributes can be determined (at least in part) based on physical attributes of the contributing users associated with that virtual avatar. For example, physical attributes of the avatar can be based upon the physical attributes of the contributing users. Physical attributes from the contributing users can be provided manually through a user interface or measured using a measurement device (e.g. a measurement application provided on a user device). Examples of physical attributes can include body segment length (e.g. arm length, leg length, torso length), body segment girth (e.g. arm girth, leg girth, waist girth, thigh girth, calf girth), shoe size, height, weight, eye colour, hair style, hair colour, facial hair, gender, clothing, etc.

Optionally, the contributing users can select the physical attributes for the virtual avatar from amongst the physical attributes of the contributing users.

For example, when determining a leg length for the virtual avatar, the contributing users can select a leg length from amongst the leg lengths of the individual users.

Alternatively or in addition, the physical attributes for the virtual avatar can be determined as a combination of the physical attributes of the contributing users. Optionally, individual physical attributes can be determined as a combination of the corresponding physical attribute from the plurality of contributing users (e.g. an average attribute value).

Alternatively or in addition, one or more physical attributes for the virtual avatar may be determined based on options provided to the contributing users. The options may be provided without consideration of the corresponding attributes of the contributing users.

Alternatively or in addition, individual users can also create individual avatars. The attributes of the virtual avatar may then be determined as a combination of the attributes of the individual avatars.

Alternatively or in addition, one or more physical attributes for the virtual avatar may be determined as default attribute values.

Optionally, the physical attributes for the virtual avatar can be determined (at least in part) based on sensor data obtained from the contributing users. Sensor data from the contributing users indicating the performance of exercise activities can impact the physical attributes for the virtual avatar and may modify the physical attributes over time.

For example, sensor data indicating a contributing user performing strength training may cause the avatar's muscles to increase in size. The extent of the change in the virtual avatar attributes can depend on the number of contributing users performing specified activities. For example, the change to the virtual physical attributes resulting from an individual user may be less than the change that can result from multiple contributing users performing activities. For example, if multiple users perform strength training, the avatar's muscles will grow larger than if only one user performed the strength training.

The virtual physical attributes of the virtual avatar can also degrade over time (e.g. if the contributing users do not perform any physical activity). For example, the avatar may lose muscle and gain weight if no sensor data is obtained from the contributing users.

Optionally at 360, the animation of the virtual avatar from 350 can be displayed to one or more users. For example, the animation can be displayed using a display such as display 114.

The virtual avatar can be displayed within a virtual environment as part of an interactive virtual experience. For example, the virtual avatar may participate in a virtual competition against other virtual avatars. Each of the virtual avatars can be associated with a respective plurality of contributing users. Optionally, some of the other virtual avatars may have only a single associated contributing user.

Method 300 can be implemented for various different kinds of virtual experiences, including real-time and non-real-time experiences.

Real-time implementations of method 300 can involve performing steps 310-340 (and optionally 350-360) in real-time or near-real-time. For example, the virtual avatar may participate in a real-time virtual experience, such as a real-time virtual race.

In a real-time experience, contributing users can participate in activities in real-time while sensor data is obtained from those contributing users. The sensor data can be used to determine user performance metrics, avatar performance metrics, and avatar performance characteristics in real-time or near-real-time (e.g. within a matter of seconds). The avatar performance characteristic can be used to animate and display the virtual avatar to users in real-time. This can allow users to observe how their performance impacts the virtual performance of the virtual avatar, which can encourage users to continue with the activity.

Sensor data can be obtained from users performing activities at various locations, including both indoor locations and outdoor locations. Users may participate in activities at a fixed location (e.g. using exercise equipment at a specified indoor location) and/or while moving between locations (e.g. participating in an outdoor run or cycling event).

Sensor data can be obtained from users participating in fixed locations using fitness equipment such as treadmills, stationary bikes and rowing machines. This may allow users to participate in real-time activities while easily viewing the corresponding virtual activity through a display such as a television screen, computer screen, smartphone screen, or exercise machine screen.

Optionally, some or all of the contributing users associated with a particular virtual avatar may participate from a single location such as a gym. This may provide users with further encouragement to improve the performance of the virtual avatar. This may also allow multiple contributing users to view a virtual experience using a shared display.

As noted above, the virtual avatars can participate in virtual interactive experiences within a virtual environment. The virtual environment can be defined in various ways.

Optionally, the virtual environment can be defined based on an existing real-world terrain. For example, the virtual environment can be defined to represent an existing competition route such as the Tour de France route.

Optionally, where contributing users are all participating in an outdoor activity along the same terrain, the virtual environment can be defined based on the terrain experienced by the contributing users.

Alternatively or in addition, the virtual environment can be generated as a unique virtual environment. The unique virtual terrain may be defined partially based on an existing real-world or as an entirely generated terrain (e.g. a procedurally-generated environment).

Optionally, the virtual environment can be defined to incorporate virtual environmental modification factors. The virtual environmental modification factors can include virtual weather factors or other virtual environmental factors that impact how the virtual avatar's performance characteristics translate into performance of a specified activity. For example, a virtual wind factor may slow down or speed up a virtual avatar depending on the wind direction relative to the direction of motion of the virtual avatar.

Virtual environmental factors can also affect the terrain of the virtual experience. For example, a virtual race may be defined to occur along a crumbling track. The virtual avatar may be required to complete the virtual race before the track crumbles into the earth. This may provide contributing users with encouragement to perform at a specified level during the experience.

Optionally, the virtual environmental factors can change over the course of a virtual experience. This can introduce different conditions throughout the virtual race, encouraging users to adapt their performance to the changed conditions. For example, the virtual environment may include a crumbling section (e.g. a crumbling bridge) requiring the contributing users to increase speed while allowing the users to continue at a lesser pace after passing the bridge.

Optionally, contributing users who are participating using fitness equipment that includes adjustable intensity levels may synchronize their fitness equipment with a virtual experience. This may allow the intensity level of the exercise equipment to be automatically adjusted to account for changes in the virtual terrain and/or virtual environmental factors. For example, when the incline or decline of the virtual terrain changes, the incline of a contributing user's treadmill or the resistance level of a user's stationary bike can be adjusted to reflect the changes in the virtual terrain.

Alternatively, the virtual avatar performance may only be impacted by changes in the virtual terrain. This can allow users to continue participating in a virtual activity even without fitness equipment that can automatically synchronize to the changes in the virtual environment. Users may, nonetheless, adjust their performance in order to account for changes in the virtual environment.

Optionally, the virtual terrain for a given virtual experience may be specified in advance. This may allow users to form a team or group of contributing users who are suited to the specified virtual terrain.

Alternatively, the virtual terrain for a given virtual experience may not be specified in advance. This may encourage users to form a team or group of contributing users who are well-rounded and can perform well on a variety of different terrains.

For contributing users performing activities while moving (e.g. outdoor cycling or running activities), it may be difficult to provide those users with a display of the virtual environment in real-time. Optionally, the virtual experience can be presented to the user through a device such as a smartphone or smart glasses.

Alternatively or in addition, auditory feedback or haptic feedback on the virtual activity can be provided to the user (e.g. through a device such as a smartphone or smartwatch). This can encourage the user to continue participating in the activity in order to contribute to the performance characteristic of the corresponding virtual avatar even though the user cannot view the virtual activity in real-time.

Alternatively, a virtual avatar can participate in a non-real-time virtual experience. In the non-real-time virtual experiences, sensor data obtained from contributing users at one or more data collection sessions can be used to determine the user performance metrics, avatar performance metrics, and avatar performance characteristics.

For non-real-time experiences, sensor data can also be obtained from users performing activities at various locations including both indoor and outdoor locations. This sensor data can be obtained in essentially the same manner as for real-time experiences. However, the virtual activity in which the corresponding virtual avatar participates may occur at a different time from when the sensor data is obtained. These non-real-time experiences may effectively provide a predictive model of how the virtual avatar would perform in a real-time virtual activity.

Optionally, sensor data can be obtained from contributing users over the course of multiple collection sessions. The corresponding sensor data can be stored in a non-transitory storage medium, e.g. associated with a remote processing device 108 and/or cloud device 110. The sensor data used to generate the avatar performance characteristic can include a subset of the sensor data obtained from the contributing users.

The subset of sensor data used to determine the avatar performance characteristic can be determined in various ways. For example, the subset of sensor data can be selected as the sensor data indicating a contributing user's peak performance for a particular activity.

Alternatively or in addition, the subset of sensor data can include all of the sensor data from the contributing users. For example, the sensor data can be combined (e.g. averaged or summed) for each contributing user in order to determine the user performance metric.

Optionally, the sensor data for the contributing users may be weighted prior to being combined to determine the user performance metric. The sensor data sessions can be weighted in various ways, for example, by allocating more weight to recent sensor data sessions.

The sensor datasets associated with the plurality of contributing users, and the subset of sensor datasets used to generate an avatar performance characteristic may be displayed to users through a graphical user interface. This may provide users with feedback on how their performance has contributed to the performance characteristic of the corresponding virtual avatar.

Figure 8A:
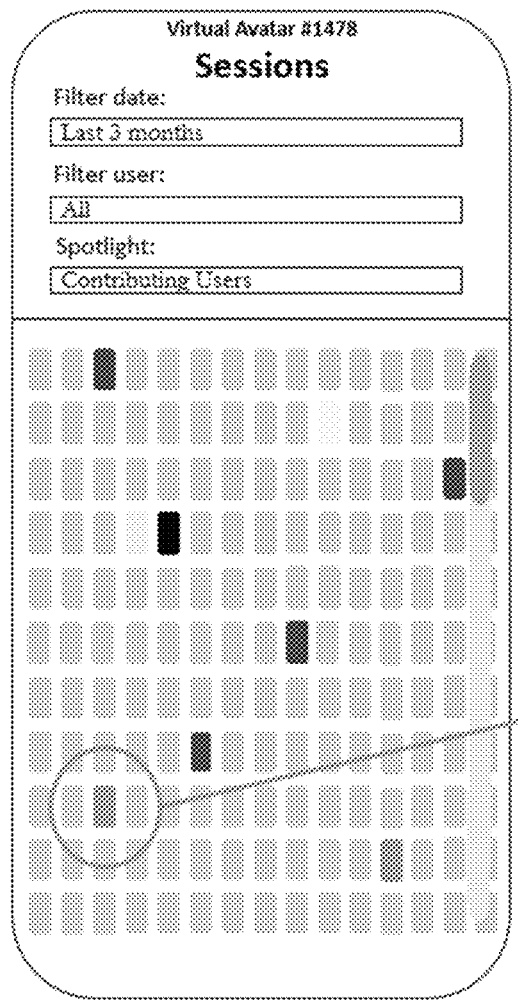
FIGS. 8A-8B are screenshots illustrating graphical user interfaces showing data collection sessions used to generate an avatar performance metric.
Figure 8B:
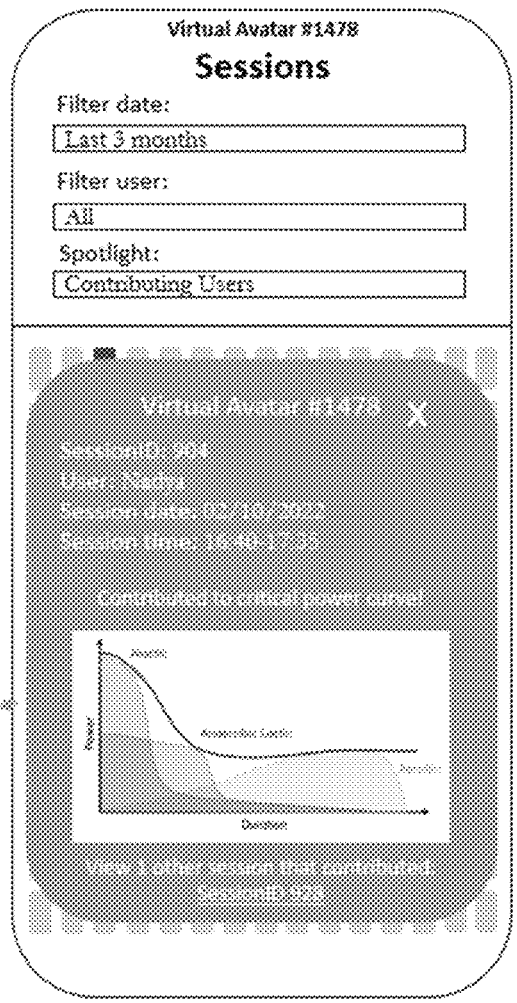

FIGS. 8A and 8B illustrate an example graphical user interface that may be displayed to a user. FIG. 8A illustrates a graphical user interface showing a visualization of sensor datasets obtained from contributing users over a specified time period (the last three months). The graphical user interface illustrates a visual representation of a plurality of session logs for the plurality of contributing users. Each session log (i.e. sensor dataset corresponding to a data collection session) may be stored on the non-transitory storage memory of a remote processing device 108 and/or cloud server 110.

The subset of sensor datasets from each contributing user that was used to determine the corresponding avatar performance characteristic are highlighted in FIG. 8A. A user can select a particular sensor dataset in order to obtain additional information relating to that sensor dataset.

FIG. 8B illustrates a graphical user interface showing a detailed sensor dataset display corresponding to the selection of a particular sensor dataset from FIG. 8A. As shown in FIG. 8B, the detailed display for the sensor dataset includes the identity of the corresponding contributing user, the date of the collection session, and an example of a corresponding user metric (a power curve metric) determined for that collection session.

The discussion of method 300 herein above describes the process applied to generate a single virtual avatar. It should be understood, however, that method 300 may be applied to generate multiple different virtual avatars based on sensor data from different groups of contributing users. The plurality of virtual avatars so generated can each be animated and displayed to users of system 100. For example, multiple virtual avatars may be animated and displayed within a shared virtual environment as part of a virtual interactive experience, such as an avatar race or other competition.

Optionally, the virtual avatars can also participate in virtual interactive experiences that are not competitive with other virtual avatars. For example, contributing users may participate in individual virtual activities in which the virtual avatar is shown within a virtual environment. For example, a contributing user may perform an activity (e.g. going for a run) and the virtual avatar can participate in a corresponding virtual activity along with the user.

Alternatively or in addition, a virtual avatar can interact with other virtual avatars in a non-competitive activity. The virtual environment can include an open-world environment that the virtual avatar can explore and perform various activities (similar to open-world video gaming activities). Virtual avatars can interact in the open-world environment in various ways, which may encourage growth of the contributing user community.

The performance of a virtual avatar in virtual interactive competitions can also provide the virtual avatar with rewards that impact the virtual avatar's performance and/or provide the virtual avatar with points or currency usable within the virtual environment. For example, virtual currency can be used to purchase virtual goods (e.g. virtual apparel, avatar skins, performance advantages, household items for the avatar) within the virtual environment and/or real-world items (e.g. coupons for an athletic apparel store) for the corresponding contributing user(s).

Figure 4:
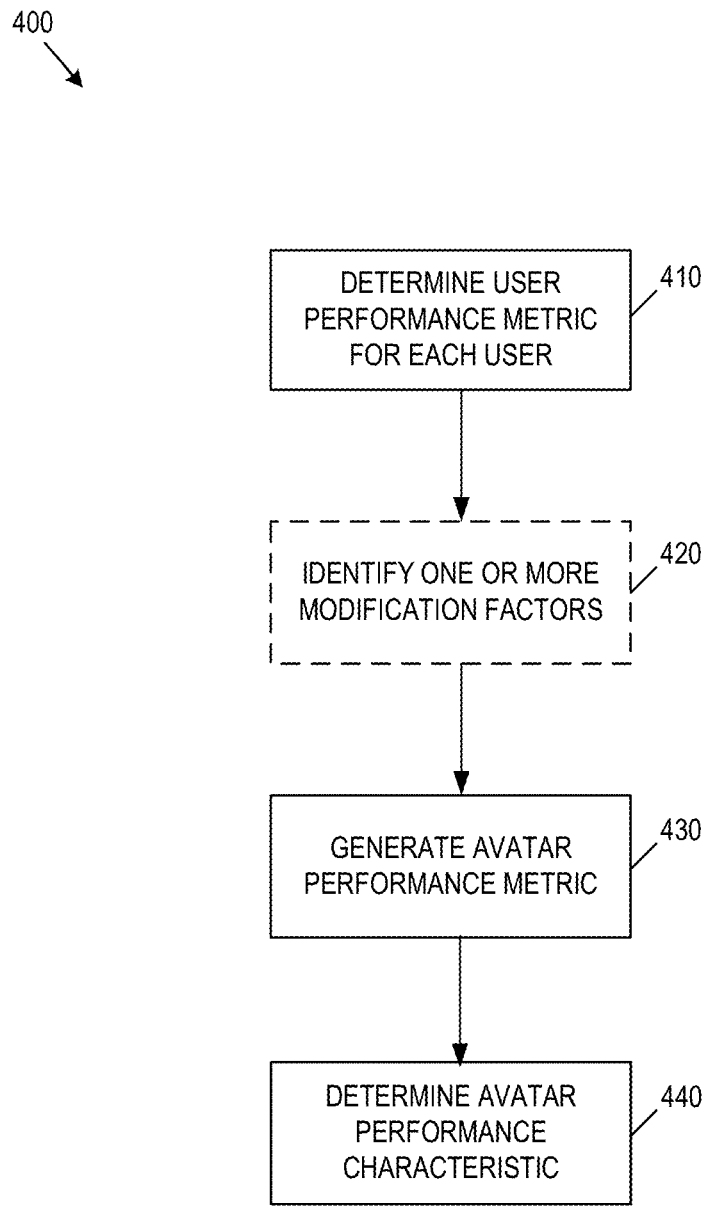
FIG. 4 is a flowchart illustrating an example of a method for determining an avatar performance characteristic, which may be used with the method shown in FIG. 3.

Referring now to FIG. 4, shown therein is an example method 400 of determining an avatar performance characteristic that may be used with a method of generating a virtual avatar such as method 300. The method 400 may be applied to determine the performance characteristic of a virtual avatar that can impact how the virtual avatar performs in a virtual interactive experience.

At 410, a user performance metric can be determined for each contributing user associated with a particular virtual avatar. The user performance metric for each user can be determined based on sensor data obtained from one or more sensor collection sessions for that contributing user.

Various different types of performance metrics can be determined for a contributing user. For example, the user performance metric can be determined as a power curve. A power curve can be determined for each contributing user associated with a particular virtual avatar.

The power curve for a contributing user can be determined to correspond to a maximum power exerted by the first user over time. That is, the power curve can be defined to represent the maximum level of power that a user can exert for specified durations of time.

Various different approaches can be used to determine the level of power being exerted by a user. The method used to determine the level of power being exerted by a user can vary depending on the type of activity being performed.

An example process for determining a contributing user's running power is described in Applicant's co-pending U.S. patent application Ser. No. 17/990,598 entitled "SYSTEM AND METHOD FOR DETERMINING RUNNING POWER", the entirety of which is incorporated herein by reference.

An example process for determining a contributing user's cycling power is described in Applicant's co-pending U.S. patent application Ser. No. 17/989,914 entitled "SYSTEM AND METHOD FOR DETERMINING CYCLING POWER", the entirety of which is incorporated herein by reference.

Physics-based approaches can also be used to determine a user's power, examples of which are also described in the '517 and '994 applications.

The power curve for a contributing user may be determined as a critical power curve. The critical power curve can specify an absolute level of power achievable by the contributing user.

Alternatively, the power curve for a contributing user may be determined as a critical specific power curve. A critical specific power curve can be defined to be independent of the user's mass. For instance, a critical specific power curve can be determined by dividing the contributing user's critical power value by the contributing user's mass. This may be desirable to allow contributing users with different demographic profiles to compete on a more level playing field.

A power curve for a contributing user can be determined using sensor data obtained from that user for one or more data collection sessions. In some examples, the power curve for a contributing user can be determined based on sensor data obtained from a plurality of data collection sessions.

A contributing user may perform a specified activity multiple times (i.e. for multiple data collection sessions). The contributing user can perform the same activity at a variety of levels of exertion and duration (e.g. for running, a contributing user may collect data from a plurality of sessions while running at levels of exertion ranging from quick sprints to long, slow jogs). Sensor datasets can be obtained from the user for each particular combination of a level of exertion and duration.

User power levels can be determined for each of the sensor datasets obtained from a contributing user. The user power level data can be aggregated and used to generate a power curve for the individual. The power curve can be defined as a plot of the user's power level vs. duration.

A contributing user's power curve can be defined based on sensor datasets corresponding to different types of exertion by the users. For example, the sensor datasets may be categorized into different exertion intervals (e.g. three exertion intervals such as an alactic interval, an anaerobic lactic interval, and an aerobic interval). The user power levels for each exertion interval can be aggregated and used to define the user's power curve.

Figure 5A:
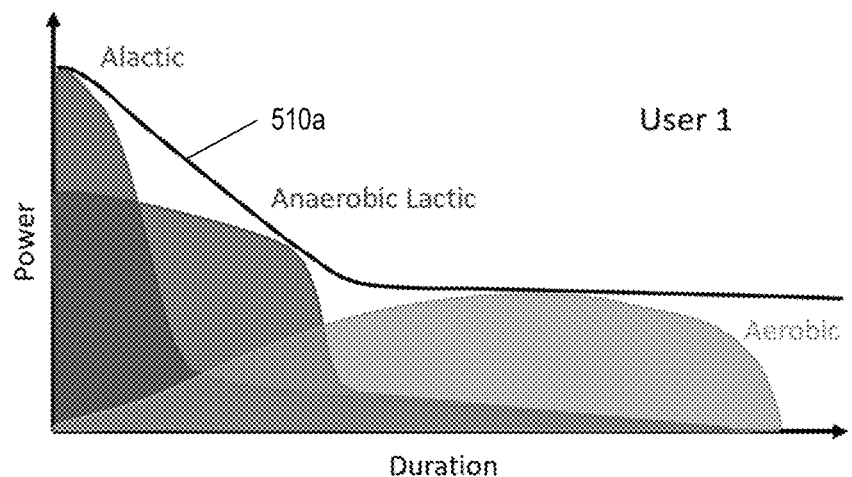
FIG. 5A is a plot illustrating an example of a power curve metric determined for a first user.
Figure 5B:
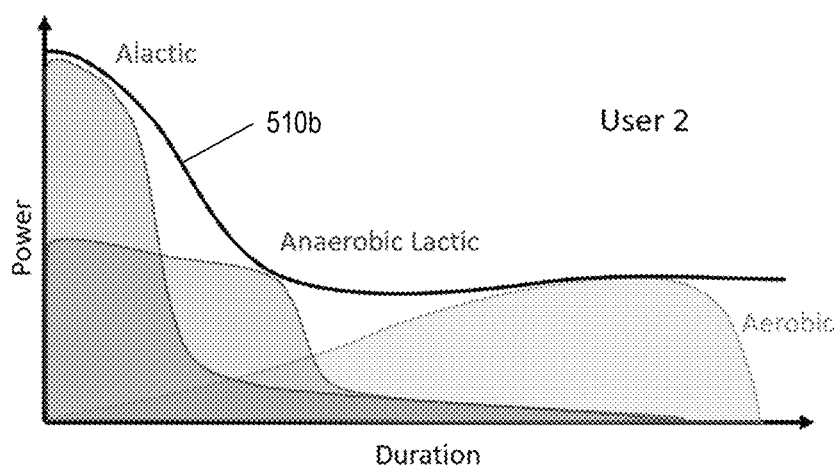
FIG. 5B is a plot illustrating an example of a power curve metric determined for a second user.

FIGS. 5A and 5B illustrate examples of critical power curves 510a and 510b determined for two contributing users. As shown in FIGS. 5A and 5B, the critical power curve 510 is determined as a combination of the user's power level for different exertion intervals over time.

As shown in FIG. 5A, interval-specific power curves are determined for the first contributing user for each exertion interval (e.g. alactic, anaerobic lactic, and lactic). The first power curve 510a is then determined by combining the interval-specific power curves from each interval.

Similarly, as shown in FIG. 5B, interval-specific power curves are determined for the second contributing user for each exertion interval (e.g. alactic, anaerobic lactic, and lactic). The second power curve 510b is then determined by combining the interval-specific power curves from each interval.

Apart from power curves, other user performance metrics can also be determined using the sensor data obtained from contributing users. For example, the user performance metric can be determined as a user pace metric for each contributing user. This may be particularly useful in real-time virtual interactive experiences.

The manner in which the user pace is determined can vary depending on the particular activity being performed by a user. For example, for a running activity the user pace metric can be determined as the contributing user's running speed, for a cycling activity the user pace metric can be determined as a cycling speed or a cycling cadence, for a rowing activity the user pace metric can be determined as a stroke rate and so forth.

A contributing user's running speed can be determined in various ways. For example, where a contributing user is running or walking on a treadmill, the running speed value may be determined based on the speed setting of the treadmill.

Alternatively or in addition, the user's running speed value may be determined based on sensor data received from the user (e.g. at 310). A plurality of strides can be identified in the sensor data received from the user. For each stride, a running speed may be determined based on a stride time and a stride length of the stride period corresponding to that stride. The stride time and stride length may be determined using the sensor data. An example process for determining a contributing user's running speed is described in Applicant's co-pending U.S. patent application Ser. No. 17/990, 598 entitled "SYSTEM AND METHOD FOR DETERMINING RUNNING POWER", the entirety of which is incorporated herein by reference.

A contributing user's cycling speed or cadence can be determined in various ways. For example, where a contributing user is cycling on a stationary bike, the cycling speed or cadence value may be determined by the stationary bike.

Alternatively or in addition, the user's cadence may be determined based on sensor data received from the user (e.g. at 310). An example process for determining a contributing user's cadence is described in Applicant's co-pending U.S. patent application Ser. No. 17/989,914 entitled "SYSTEM AND METHOD FOR DETERMINING CYCLING POWER", the entirety of which is incorporated herein by reference.

Similar approaches may be used to determining a user pace metric for other activities performed by a contributing user. For example, where a contributing user is rowing using an indoor rower, the user's stroke rate may be determined by the indoor rower.

Optionally at 420, one or more modification factors can be determined. The modification factors can be used to modify the user performance metric, avatar performance metric and/or avatar performance characteristic. Modification factors can be applied to upgrade (i.e. improve) or degrade (i.e. reduce) a corresponding user performance metric, avatar performance metric and/or avatar performance characteristic.

A modification factor generally refers to a factor that is determined using data different from, or in addition to, the data used to determine the user performance metric at 410. Various different types of modification factors may be determined, including user modification factors and/or historical modification factors.

User modification factors generally refer to modification factors that are determined based on sensor data obtained from one or more contributing users. The user modification factors can include factors relating to a user's technique in performing one or more activities, a user's health, a user's performance in other activities, and so forth.

The user modification factors may encourage contributing users to achieve a maximum level of performance for the virtual avatar, but without compromising technique or safety. Accordingly, the user modification factors can be applied to reduce the avatar performance characteristic (or user performance metric or avatar performance metric) if poor technique is exhibited or sensor data detects that the user is performing the activity in an unsafe manner.

Various different examples of user modification factors may be determined, such as a user symmetry modification factor, a user balance modification factor, a user flexibility modification factor, a user heartrate modification factor, a user strength modification factor, a user jump height modification factor, a user smoothness modification factor, a movement efficiency modification factor, and a training frequency modification factor.

A user symmetry modification factor may be applied to reduce the value of the user performance metric (or avatar performance metric or avatar performance characteristic) based on a level of asymmetry determined for one or more contributing users.

For example, a power level (e.g. a running power level) may be determined separately for each of the user's feet based on sensor data acquired for each foot individually. A bilateral power asymmetry may be calculated by comparing the mechanical running power determined for the left foot during a stride to the mechanical running power determined for the right foot during its subsequent stride (or vice versa).

Various different symmetry modification factors may be determined. For example, for a running activity the user symmetry modification factor can be determined as one or more of a ground contact time (GCT) symmetry, a foot strike index symmetry, a bilateral power symmetry and so forth. Deviations from a 1:1 symmetry ratio between the user's feet can be used to degrade the user performance metric (or avatar performance metric or avatar performance characteristic).

Figure 6A:
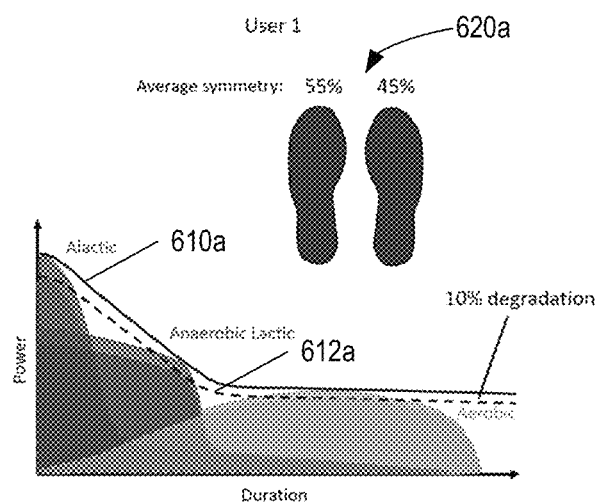
FIG. 6A is a plot illustrating an example power curve metric determined for a first user and a symmetry modification factor determined for the first user.
Figure 6B:
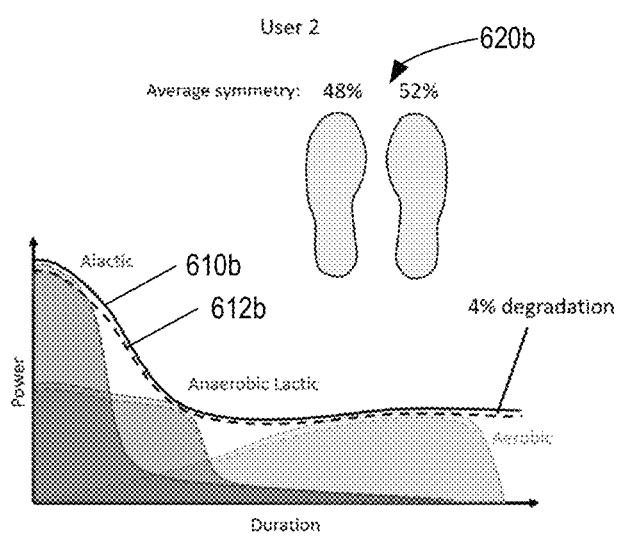
FIG. 6B is a plot illustrating an example power curve metric determined for a second user and a symmetry modification factor determined for the second user.

For example, FIGS. 6A and 6B illustrate examples of critical power curves 610a and 610b determined for two contributing users. FIGS. 6A and 6B also show corresponding user symmetry modification factors 620a and 620b for the two contributing users. In the example shown in FIGS. 6A and 6B, the user symmetry modification factors 620a and 620b are determined as ground contact time symmetry ratios.

As noted above, the user modification factors can be used to modify the user performance characteristic determined for a contributing user. In the example shown in FIGS. 6A and 6B, the user symmetry modification factors 620a and 620b are applied to degrade the corresponding power curves (610a and 610b) by the percent difference in the asymmetry. Accordingly, the modified power curve 612a for the first user shows a 10% degradation as compared to the unmodified power curve 610a. The modified power curve 612b for the second user shows a 4% degradation as compared to the unmodified power curve 610b.

A user balance modification factor can also be used to modify a user performance metric, avatar performance metric and/or avatar performance characteristic. A user balance modification factor can be determined based on sensor data obtained from a contributing user.

Figures 10A, 10B:
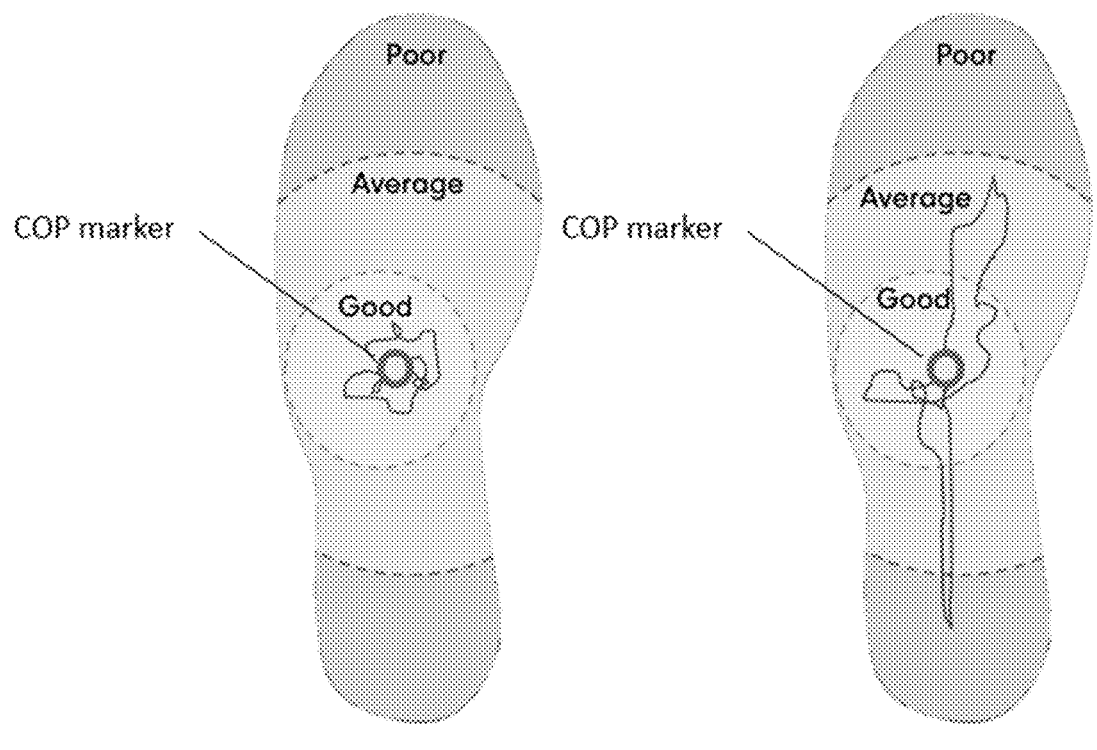
FIGS. 10A and 10B are diagrams illustrating a first user balance modification factor and a second user balance modification factor.

For example, a contributing user may perform a specified balancing activity (e.g. standing on one foot for 30 seconds). Sensor data obtained during the specified balancing activity may be used to determine the user's center of pressure (COP) during the balance activity. Movement of the user's COP over the course of the balance activity can be scored (e.g. as a numerical value or assigned to a category such as "good", "average" and "poor") as shown in FIGS. 10A and 10B.

A user flexibility modification factor can also be used to modify a user performance metric, avatar performance metric and/or avatar performance characteristic. A user flexibility modification factor can be determined based on sensor data obtained from a contributing user.

Figures 11A, 11B:
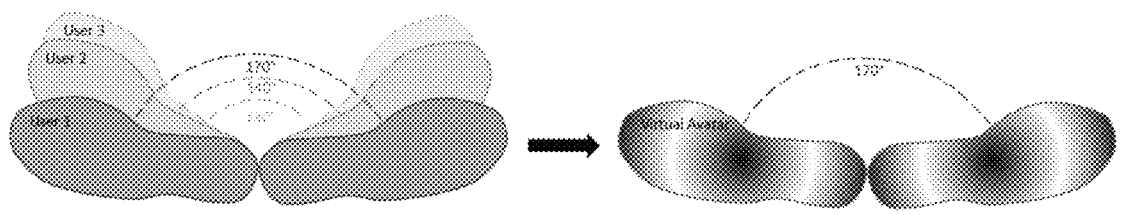
FIG. 11A is a diagram illustrating examples of flexibility modification factors for multiple users.
FIG. 11B is a diagram illustrating an example of an avatar hip flexibility modification factor determined based on the flexibility modification factors shown in FIG. 11A.

A contributing user may perform one or more specified flexibility activities. Sensor data obtained during the specified flexibility activity may be used to determine the user's flexibility or mobility. For example, a hip rotation modification factor may be determined by contributing users standing with their heels together, then turning out their toes (rotating their legs at the hips). The level of hip rotation can then be determined from the sensor data as shown in FIG. 11A.

A user heartrate modification factor can also be used to modify a user performance metric, avatar performance metric and/or avatar performance characteristic. Sensor data from a heart rate monitor can be obtained while a contributing user performs a specified activity. The heart rate data from each contributing user can be used to define a corresponding user heartrate modification factor.

A user strength modification factor can also be used to modify a user performance metric, avatar performance metric and/or avatar performance characteristic. Sensor data can be obtained while a contributing user performs a specified weightlifting activity. For example, force sensor data can be used to determine the weight of an object being lifted by a contributing user. The force sensor data from each contributing user can be used to define a corresponding user strength modification factor.

A user jump height modification factor can also be used to modify a user performance metric, avatar performance metric and/or avatar performance characteristic. A user jump height modification factor can be determined based on sensor data obtained from a contributing user.

For example, a contributing user may perform a specified jumping activity such as a countermovement jump. Sensor data obtained during the specified jumping activity may be used to determine the user's jump height modification factor.

The user modification factors can also include user health and wellness modification factors. The user health and wellness modification factors can be determined based on input received from the contributing users relating to aspects of their general health and wellness, such as nutritional information, sleep information and so forth.

The modification factors can also include user historical modification factors. The user historical modification factors can include historical data relating to activities performed by the contributing users. Examples of user historical modification factors can include summed activity factors such as total exercise time, total distance, total number of steps, etc. Examples of user historical modification factors can also include historical trend factors and recency factors, such as frequency of exercise and/or recency of data collection sessions.

The modification factors can also include avatar historical modification factors. The avatar historical modification factors can include historical data relating to virtual activities participated in by the virtual avatar as well as the avatar's performance in those activities. Examples of avatar historical modification factors can include total activity time, number of virtual activities completed or won, etc. Examples of avatar historical modification factors can also include historical trend factors and recency factors, such as frequency of participation and/or recency of participation.

The modification factors may also include live activity modification factors. Live activity modification factors may be specified for a particular real-time virtual activity that contributing users participate in. These live activity modification factors may be defined as thresholds or goals for the contributing users to reach during a virtual activity. This may encourage the contributing users to work together throughout the course of the virtual activity.

At 430, an avatar performance metric can be generated based on the user performance metrics determined at 410.

The avatar performance metric may be generated by selectively combining the user performance metrics from 410. For example, the avatar performance metric can be generated by comparing the user performance metrics over a duration of time. At each point in time, the highest value user performance metric from any of the contributing users may be selected as the avatar performance metric.

Figure 5C:
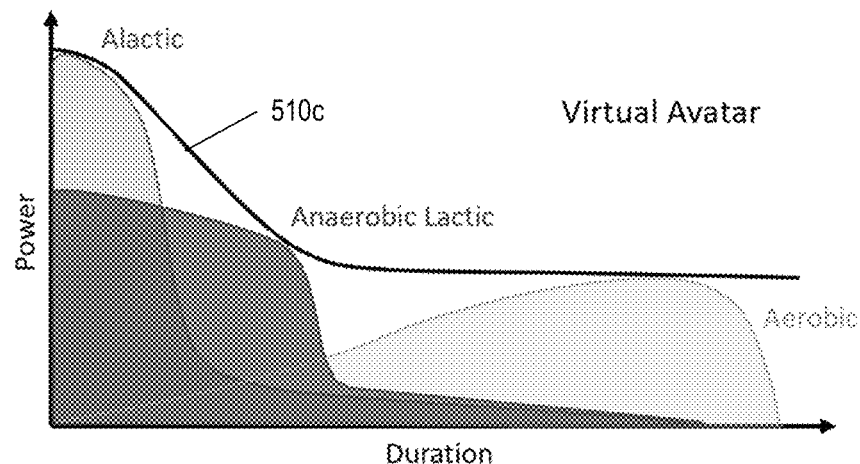
FIG. 5C is a plot illustrating an example of an avatar power curve metric generated based on the power curve metrics shown in FIGS. 5A and 5B.

FIG. 5C illustrates an example of an avatar performance metric (in this case a critical power curve) generated by selectively combining the first user performance metric 510a from FIG. 5A and the second user performance metric 510b from FIG. 5B. For the first user, the power curve 510a shows a relatively higher anaerobic lactic power while the power curve 510b for the second user has a relatively higher alactic and aerobic power.

The power curve 510c for the virtual avatar is determined by combining the maximum power levels from the two contributing users' critical power curves. As shown in FIG. 5C, the avatar power curve is determined by choosing the maximum of the first and second power curves 510a and 510b respectively for each of the alactic interval, an anaerobic lactic interval and alactic interval.

Alternatively or in addition, the avatar power curve can be generated by identifying a maximum value for each point in time along the first and second power curves. The maximum value for a given point in time can be identified as the maximum value as between the first and second power curve at that given point in time. The avatar power curve can then be defined using the maximum value for each point in time. As a result, the avatar power curve can include power curve values from each of the user power curves within a given interval.

As noted above, the user performance metrics determined at 410 may be modified based on one or more modification factors determined at 420. The avatar performance metric may then be determined based on the modified user performance metrics.

Figure 6C:
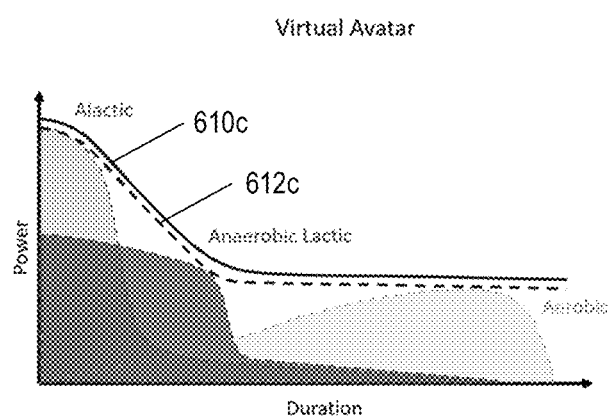
FIG. 6C is a plot illustrating an example of an avatar power curve metric generated based on the power curve metrics and symmetry modification factors shown in FIGS. 6A and 6B.

For example, FIGS. 6A and 6B illustrate examples of modified power curves 612a and 612b that have been degraded based on respective user symmetry modification factors 620a and 620b. As shown in FIG. 6C, the avatar power curve 612c can then be determined based on the modified power curves 612a and 612b. As FIG. 6C illustrates, the avatar power curve 612c is degraded as compared to the power curve 610c that would have resulted from combining the unmodified power curves 610a and 610b.

Alternatively, modification factors may be applied to modify the avatar performance metric without modifying the respective user performance metrics for the plurality of contributing users. For example, the user modification factors determined for the plurality of contributing users can be combined to generate a combined user modification factor for the virtual avatar.

Figure 7A:
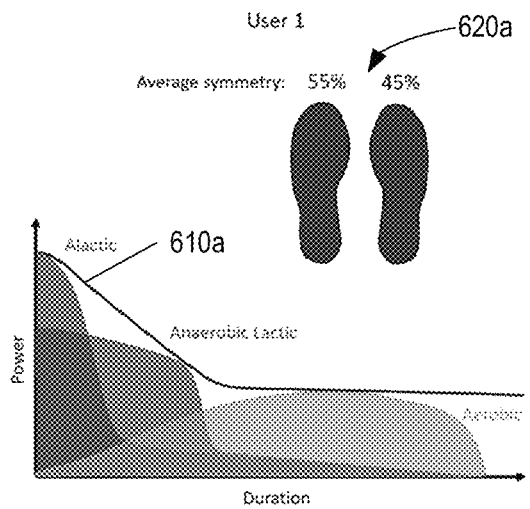
FIG. 7A is the plot illustrating the example power curve metric determined for the first user and the symmetry modification factor determined for the first user.
Figure 7B:
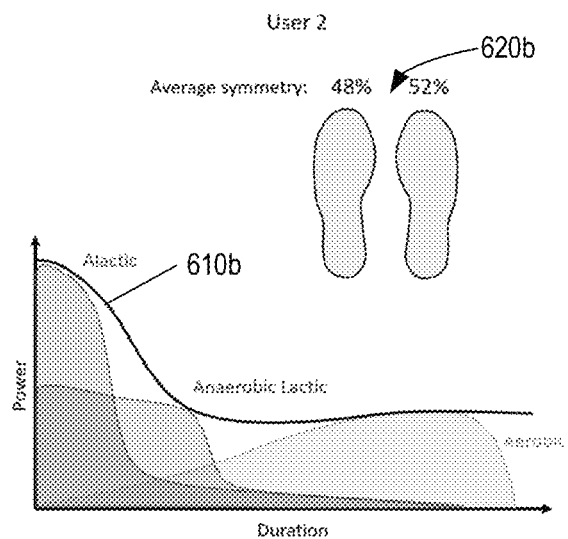
FIG. 7B is the plot illustrating the example power curve metric determined for the second user and the symmetry modification factor determined for the second user.
Figure 7C:
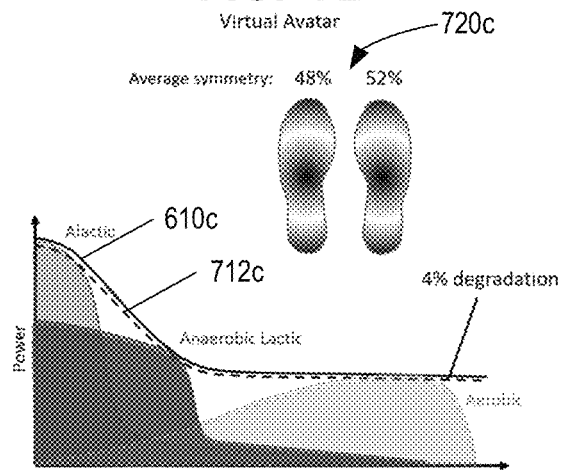
FIG. 7C is a plot illustrating another example of an avatar power curve metric generated based on the power curve metrics and symmetry modification factors shown in FIGS. 7A and 7B.

For example, FIGS. 7A and 7B illustrate the unmodified power curves 610a and 610b and respective user symmetry modification factors 620a and 620b. As shown in FIG. 7C, a combined avatar symmetry modification factor 720c is determined based on the user symmetry modification factors 620a and 620b. In this example, the combined avatar symmetry modification factor 720c was determined as the best (i.e. the least worst) user symmetry modification factor 620b. An unmodified avatar power curve 610c can then be determined based on the unmodified power curves 610a and 610b. The avatar power curve 712c can then be determined by modifying the unmodified avatar power curve 610c using the combined avatar symmetry modification factor 720c.

As noted above, the user performance metric determined at 410 may be a user pace metric. In some examples, the avatar performance metric can be an avatar pace metric determined based on the user pace metrics from the plurality of contributing users. This may be particularly useful during real-time virtual interactive experiences.

Figure 9A:
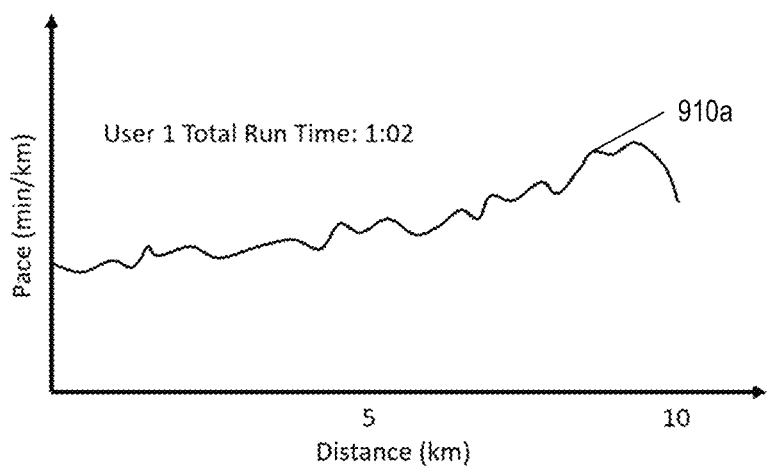
FIG. 9A is a plot illustrating an example pace metric determined for a first user.
Figure 9B:
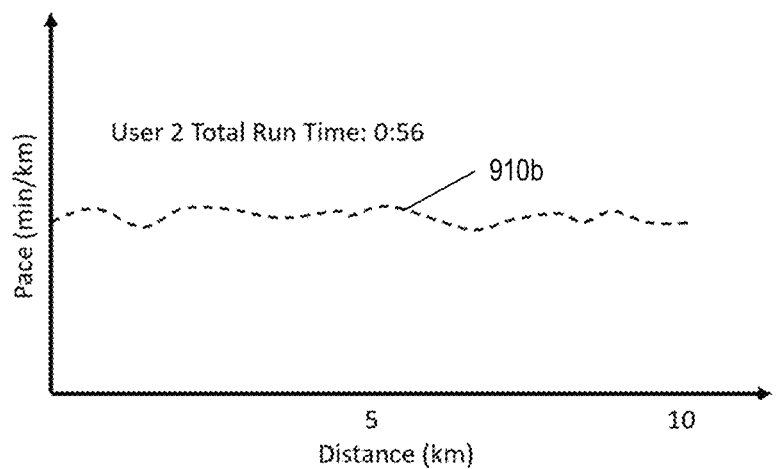
FIG. 9B is a plot illustrating an example pace metric determined for a second user.

FIGS. 9A-9B illustrate example plots of user pace metric 910a and 910b determined for two contributing users. In the example illustrated, the user pace metrics 910a and 910b are determined as running speed metrics for contributing users participating in a 10 km running activity.

Figure 9C:
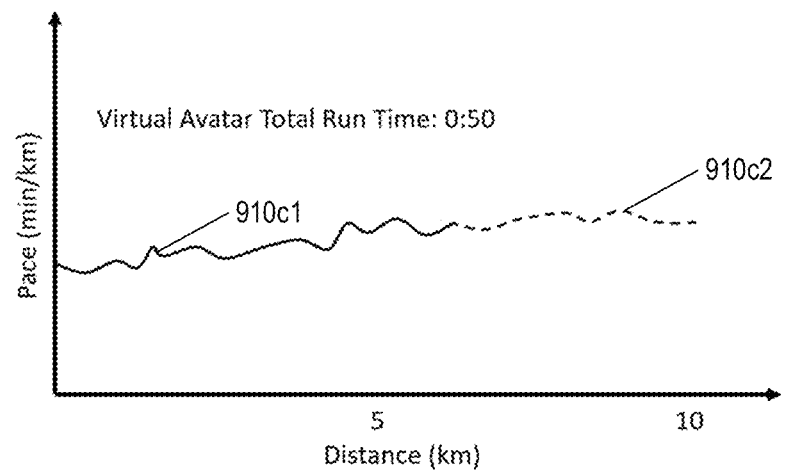
FIG. 9C is a plot illustrating an example avatar pace metric generated based on the user pace metrics shown in FIGS. 9A and 9B.

FIG. 9C illustrates an example plot of an avatar pace metric determined for a virtual avatar based on the user pace metrics 910a and 910b. In the example illustrated, the avatar pace metric is determined as the pace of the fastest contributing user at each point in time during the activity. As shown in FIG. 9C, a first portion 910c1 of the avatar pace metric corresponds to the first user pace metric 910a while a second portion 910c2 of the avatar pace metric corresponds to the second user pace metric 910b.

The examples given above involve an avatar performance metric being determined as the greatest value of the user performance metrics from the plurality of contributing users. However, the avatar performance metric can be determined from the user performance metrics in various different ways. For example, the avatar performance metric may be determined using the maximum value of the corresponding user performance metrics, a minimum value of the corresponding user performance metrics, an average value of the corresponding user performance metrics, a sum of the corresponding user performance metrics, a multiplication product of the corresponding user performance metrics, and various other functions and combinations of the corresponding user performance metrics.

The manner of generating the avatar performance metric from the plurality of user performance metrics can also be defined to minimize or prevent users from participating in virtual activities in a relay manner (i.e. by contributing users alternating higher and lower effort levels). For instance, the avatar performance metric may be limited to being within a specified range (e.g. an absolute range or a relative range such as a percent value) of the lowest user metric from the plurality of contributing users. Alternatively or in addition, the plurality of user metrics from the plurality of contributing users may be limited to being within a specified range of one another (e.g. all users must run within 10% of each other's speed). Alternatively or in addition, the plurality of user metrics from the plurality of contributing users may be limited to being within an absolute specified range (e.g. for a 10 km run, all users must maintain a pace of at least 6:00 min/km for the entire duration).

Optionally, the user performance metrics associated with each contributing user can be assigned a corresponding weighting. The avatar performance metric can then be determined using the weighted user performance metrics from each contributing user. For example, the user performance metrics associated with contributing users who have completed more data collection sessions may be weighed more heavily than contributing users that rarely participate (i.e. have fewer data collection sessions).

At 440, the virtual avatar performance characteristic can be determined from the avatar performance metric determined at 430. The avatar performance characteristic can be determined from the corresponding avatar performance metric in various ways.

For example, a pace avatar performance metric can be used to determine a corresponding speed-based avatar performance characteristic. The speed-based avatar performance characteristic can be determined as the pace avatar performance metric combined with any modification factors relating to the avatar and/or the virtual interactive experiences. For instance, the speed-based avatar performance characteristic can be determined as the pace avatar performance metric modified by any relevant modification factors.

A speed-based avatar performance characteristic can also be determined based on an avatar power curve. For example, a running speed performance characteristic can be calculated from a point along a critical power curve using:

$$P = ECORmv + 0.5\rho c_d A(v+v_w)^2 v + i/(100mgv\eta) \tag{1}$$

where P is power, ECOR is energy cost of running, m is mass, v is speed, $\rho$ is density of air, $c_d$ is drag coefficient, A is cross-sectional area, $v_w$ is wind speed, i is gradient (in %), and $\eta$ is hill factor (in %). Equation (1) includes a wind resistance term ($0.5\rho c_d A(v+v_w)^2 v$) and a slope term ($i/(100 mgv\eta)$) which can depend on the attributes of the virtual environment for a given virtual interactive experience.

The running speed performance characteristic can be used to establish how the virtual avatar performs in a virtual interactive experience that involves a running race. The virtual avatar's run time for a virtual running race can be calculated from the running speed (determined from Eq. 1) and the associated run distance. The run time can be compared to the run times of other virtual avatars, previous runs of the same virtual avatar, and/or real-time runs of professional athletes.

The performance characteristic can also be used to allow the virtual avatars to compete in real-time or non-real-time virtual competitions with other virtual avatars. For example, a virtual simulation of a 10 km race in which multiple virtual avatars compete can be animated and displayed to users.

As noted above, the avatar performance characteristic may be modified by one or more modification factors. For instance, user modification factors may be applied to the avatar performance characteristic directly rather than the user performance metric or avatar performance metric. For example, a running speed performance characteristic may be degraded based on a symmetry modification factor for the plurality of contributing users (e.g. the worst symmetry modification factor, the least worst symmetry modification factor, an average symmetry modification factor and so on).

Alternatively or in addition, a balance modification factor may be applied to the avatar performance characteristic. The balance modification factor for the plurality of contributing users may be determined in various ways, e.g. the worst balance modification factor, the least worst balance modification factor, an average balance modification factor and so on.

The balance modification factor may impact how the virtual avatar performs within the virtual environment, e.g. how the virtual avatar reacts to changes in the terrain or objects. For example, a virtual avatar performance characteristic modified by a poor balance modification factor may be clumsy in the virtual environment and may trip over objects or fall while running, which will slow its performance in virtual running races.

Alternatively or in addition, a flexibility modification factor may be applied to the avatar performance characteristic. The flexibility modification factor for the plurality of contributing users may be determined in various ways, e.g. the worst flexibility modification factor, the least worst flexibility modification factor (see e.g. FIG. 11B), an average flexibility modification factor and so on.

The flexibility modification factor may impact the likelihood of the virtual avatar obtaining an injury while participating in a virtual interactive experience. If the virtual avatar has good flexibility and mobility, it will be less likely to injure itself in the virtual environment. For example, an inflexible virtual avatar has an increased probability of becoming injured while completing a virtual competition, even if none of the contributing users are injured. The virtual avatar would then need time for recovery which can be reflected by a historical avatar modification factor that can limit or prevent the virtual avatar from participating in further interactive activities for a specified time period.

Alternatively or in addition, a heartrate modification factor may be applied to the avatar performance characteristic. The heartrate modification factor for the plurality of contributing users may be determined in various ways, e.g. the worst heartrate modification factor (e.g. a high heartrate), the least worst heartrate modification factor, an average heartrate modification factor and so on.

The heartrate modification factor may affect a stamina attribute of the virtual avatar. A low heartrate modification factor may result in the virtual avatar becoming less fatigued over the course of a virtual interactive experience.

The heartrate modification factor may also impact the physical appearance of the virtual avatar. For example, a virtual avatar associated with a heartrate modification factor indicating that the virtual avatar regularly burns calories may appear lean.

Alternatively or in addition, a strength modification factor may be applied to the avatar performance characteristic. The strength modification factor for the plurality of contributing users may be determined in various ways, e.g. the weakest strength modification factor, the strongest strength modification factor, an average strength modification factor and so on.

The strength modification factor may impact the physical appearance of the virtual avatar. For example, a virtual avatar associated with a strong modification factor may appear more muscular.

The strength modification factor may impact the likelihood of the virtual avatar obtaining an injury while participating in a virtual interactive experience. If the virtual avatar has good strength, it will be less likely to injure itself in the virtual environment and may require less recovery time to participate in additional virtual activities.

Alternatively or in addition, a jump height modification factor may be applied to the avatar performance characteristic. The jump height modification factor for the plurality of contributing users may be determined in various ways, e.g. the lowest jump height modification factor, the highest jump height modification factor, an average jump height modification factor and so on.

The jump height modification factor may impact how the virtual avatar performs within the virtual environment, e.g. how the virtual avatar reacts to changes in the terrain or objects. For example, a virtual avatar performance characteristic modified by a high jump height modification factor can leap over objects and hurdles more easily while a virtual avatar performance characteristic modified by a low jump height modification factor may be more likely to trip and thus slow down during a virtual interactive experience.

Alternatively or in addition, user historical modification factors such as combined activity factors and/or historical trend factors and recency factors may be applied to the avatar performance characteristic. For instance, historical modification factors indicating limited activity or limited recent activity may reduce the stamina of the virtual avatar and increase the likelihood of the virtual avatar incurring an injury. The historical modification factors may also impact the physical appearance of the virtual avatar (e.g. the virtual avatar may lose muscle and gain weight if little or no sensor data is obtained from the contributing users within a recent time period).

Alternatively or in addition, user health and wellness modification factors may be applied to the avatar performance characteristic. For example, user health and wellness modification factors may impact how well the avatar performs and can impact the physical appearance of the virtual avatar.

In some examples, the avatar performance characteristic may be determined based on a combination of real-time sensor data and previously acquired sensor datasets. For instance, the historical sensor data can be used to define a baseline avatar performance characteristic e.g. based on historical avatar attributes determined from the previously acquired sensor datasets. The historical avatar attributes can define the baseline avatar performance characteristic.

Real-time sensor data obtained from the plurality of users may be used to modify the baseline avatar performance characteristic, e.g. where the real-time sensor data deviates from the baseline avatar performance characteristic. For example, the baseline avatar performance characteristic may be determined based on a degraded avatar critical power curve that has been degraded due to one or more modification factors. If the real-time sensor data indicates that the plurality of contributing users are performing the activity in a manner that would not give rise to the modification factor (e.g. the contributing users' balance is improved in the real-time sensor data), then the avatar performance characteristic can be modified to the performance characteristic that would result from the avatar critical power curve not having been degraded (or having been degraded by less).

Alternatively or in addition, live activity modification factors can be applied to modify the avatar performance characteristic. For example, a particular real-time virtual activity may specify one or more thresholds or goals for the contributing users to achieve. Achieving these thresholds or goals can result in the live activity modification factor being applied to modify the avatar performance characteristic.

As a simple example, a running virtual activity may specify an activity goal that includes users running at a minimum pace for a specified time period (e.g. all contributing users must keep a pace of at least 4:30 min/km for the next 2 km). If the contributing users are able to satisfy this activity goal, then the avatar performance characteristic may be modified (e.g. by boosting the running speed of the virtual avatar).

The thresholds or goals may be defined as absolute values for a given activity. That is, the same thresholds or goals may be defined for all virtual avatars participating in a virtual interactive experience.

Alternatively or in addition, the thresholds or goals may be defined based on the sensor datasets associated with a given virtual avatar. For example, contributing users associated with a virtual avatar with a high baseline avatar performance characteristic may be assigned an activity goal of maintaining a pace of 4:00 min/km for the next 2 km, while contributing users associated with a virtual avatar with a lower baseline avatar performance characteristic may be given the goal of maintaining a pace of 6:00 min/km for the next 2 km. Optionally, the live activity modification factor for each of the virtual avatars may remain the same even while the activity goal is different.

Alternatively or in addition, the thresholds or goals may be defined dynamically based on the performance of the virtual avatar within the activity. Optionally, the live activity modification factor for each of the virtual avatars may vary depending on the performance of the virtual avatar within the activity. For example, additional thresholds or goals (or larger live activity modification factors) may be provided for the virtual avatars trailing in a given competition. This may ensure that the activity remains competitive throughout, encouraging contributing users to remain actively engaged.

Table 1 below provides an example of activity goals and live activity modification factors that may be defined for a real-time running virtual activity. It should be understood that the activity goals and live activity modification factors listed in Table 1 are merely exemplary.

TABLE 1

| Example Activity Goals | Example Live Activity Modification Factors |
|---|---|
| Pace-related Examples: All contributing users must maintain a pace of at least 4:30 min/km for the next 2 km All contributing users must maintain a pace of at least 6:00 min/km for the entire race One contributing user must reach a pace of 3:30 min/km and maintain this pace for 1 minute Symmetry-related Examples: User 3, with an average GCT asymmetry of 40%:60%, must match or beat user 2's average GCT asymmetry of 47%:53% before the end of the race The average bilateral power symmetry of all of the contributing users between 45-55%:45-55% by the end of the race Hill challenges Examples: At least one user must sprint up the next hill | Avatar speed boost Head start for subsequent races Elimination of wind resistance for a period of time Elimination of hills for a portion of the race Frozen time (avatar can keep moving while all other avatars are frozen for a period of time) Position catch-up (catch up to the avatar that is one position ahead) Placement of hazards for other avatars (tripping hazards, wild animals, etc.) |

While the above description provides examples of one or more processes or apparatuses or compositions, it will be appreciated that other processes or apparatuses or compositions may be within the scope of the accompanying claims.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

We claim:

1. A method of generating a virtual avatar representing a plurality of users, the method comprising:
    obtaining first sensor data from a first sensor set associated with a first user;
    determining a first user performance metric from the first sensor data;
    obtaining second sensor data from a second sensor set associated with a second user;
    determining a second user performance metric from the second sensor data;
    generating an avatar performance metric based on the first user performance metric and the second user performance metric; and
    determining an avatar performance characteristic from the avatar performance metric;
    wherein the first user performance metric is a first power curve, the second user performance metric is a second power curve, and the avatar performance metric is an avatar power curve; and
    wherein the avatar power curve is generated by:
    identifying, for each point in time along the first and second power curves, a maximum value for that point in time, wherein the maximum value for each point in time is identified as the larger of the two power values in the first and second power curves at that point in time; and
    defining the avatar power curve using the maximum value for each point in time.

2. The method of claim 1, wherein the first power curve corresponds to a maximum power exerted by the first user over time and the second power curve corresponds to a maximum power exerted by the second user over time.

3. The method of claim 1, wherein:
    the first power curve is determined by:
        determining, for at least three intervals, a first interval-specific power curve from the first sensor data; and
        determining the first power curve by combining the interval-specific power curves from each interval; and
    the second power curve is determined by:
        identifying, for the at least three intervals, a second interval-specific power curve from the second sensor data; and
        determining the second power curve by combining the second interval-specific power curves from each interval.

4. The method of claim 1, wherein the first sensor set and the second sensor set are provided using respective wearable devices, and the respective wearable devices include footwear.

5. The method of claim 1, wherein the avatar performance metric and/or the avatar performance characteristic is degraded based on at least one of an asymmetry factor, a smoothness factor, a movement efficiency factor or a training frequency factor determined from the first or second sensor data.

6. The method of claim 1, wherein the avatar performance characteristic is selected from the group consisting of a running speed, a cycling speed, a skating speed, and a cross-country skiing speed.

7. The method of claim 1, wherein the first user performance metric is a first user pace, the second user performance metric is a second user pace, and the avatar performance metric is an avatar pace.

8. A system for generating a virtual avatar representing a plurality of users, the system comprising:

first and second sensor sets wearable by first and second users, respectively;
one or more processors communicatively coupled to the first and second sensors; and
a non-transitory storage memory;
wherein the one or more processors are configured to:
obtain the first sensor data from the first sensor set associated with a first user;
determine a first user performance metric from the first sensor data;
obtain the second sensor data from the second sensor set associated with the second user;
determine a second user performance metric from the second sensor data;
generate an avatar performance metric based on the first user performance metric and the second user performance metric; and
determine an avatar performance characteristic from the avatar performance metric; and
wherein the one or more processors is configured to determine the first user performance metric as a first power curve, the second user performance metric as a second power curve, and the avatar performance metric as an avatar power curve, and wherein the one or more processors is configured to generate the avatar power curve by:
identifying, for each point in time along the first and second power curves, a maximum value for that point in time, wherein the maximum value for each point in time is identified as the larger of the two power values in the first and second power curves at that point in time; and
defining the avatar power curve using the maximum value for each point in time.

9. The system of claim 8, wherein the one or more processors is further configured to:
generate an animation of the virtual avatar based on the avatar performance characteristic; and
display the animation.

10. The system of claim 8, wherein the one or more processors is configured to determine the first power curve to correspond to a maximum power exerted by the first user over time and the second power curve to correspond to a maximum power exerted by the second user over time.

11. The system of claim 8, wherein the one or more processors is configured to:
determine the first power curve by:
determining, for at least three intervals, a first interval-specific power curve from the first sensor data; and
determining the first power curve by combining the interval-specific power curves from each interval; and
determine the second power curve by:
identifying, for the at least three intervals, a second interval-specific power curve from the second sensor data; and
determining the second power curve by combining the second interval-specific power curves from each interval.

12. The system of claim 8, wherein the first sensor set and the second sensor set are provided using respective wearable devices, and the respective wearable devices include footwear.

13. The system of claim 8, wherein the one or more processors is configured to degrade the avatar performance metric and/or the avatar performance characteristic based on at least one of an asymmetry factor, a smoothness factor, a movement efficiency factor or a training frequency factor determined from the first or second sensor data.

14. The system of claim 8, wherein the first sensor set comprises a plurality of force sensors positioned underfoot of the first user and the first sensor data comprises force sensor data from the plurality of force sensors and/or wherein the first sensor set comprises an IMU positioned on the first user and the first sensor data comprises inertial motion data from the IMU.

15. The system of claim 8, wherein the avatar performance characteristic is selected from the group consisting of a running speed, a cycling speed, a skating speed, and a cross-country skiing speed.

16. The system of claim 8, wherein the first user performance metric is a first user pace, the second user performance metric is a second user pace, and the avatar performance metric is an avatar pace.

* * * * *